(12) United States Patent    (10) Patent No.: US 11,488,484 B2
Burgess et al.    (45) Date of Patent: Nov. 1, 2022

(54) METHODS AND SYSTEMS FOR SHARING AN AIRSPACE WIDE UNMANNED AIRCRAFT SYSTEM DATABASE ACROSS A PLURALITY OF SERVICE SUPPLIERS

(71) Applicant: Wing Aviation LLC, Mountain View, CA (US)

(72) Inventors: James Burgess, Mountain View, CA (US); Reinaldo Negron, Mountain View, CA (US); Jeremy Chalmer, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 154 days.

(21) Appl. No.: 16/869,099

(22) Filed: May 7, 2020

(65) Prior Publication Data

US 2020/0279493 A1    Sep. 3, 2020

Related U.S. Application Data

(63) Continuation of application No. 15/997,556, filed on Jun. 4, 2018, now abandoned.
(Continued)

(51) Int. Cl.
*B64C 39/02*    (2006.01)
*G08G 5/00*    (2006.01)
(Continued)

(52) U.S. Cl.
CPC ......... *G08G 5/0043* (2013.01); *B64C 39/024* (2013.01); *G05D 1/0027* (2013.01);
(Continued)

(58) Field of Classification Search
None
See application file for complete search history.

(56) References Cited

U.S. PATENT DOCUMENTS 8,886,459 B2    11/2014    Stefani et al.
9,412,278 B1*    8/2016    Gong .................. G08G 5/0052
(Continued)

FOREIGN PATENT DOCUMENTS

CN    105206116    12/2014
CN    104332072    2/2015
(Continued)

OTHER PUBLICATIONS

International Searching Authority, International Search Report and Written Opinion dated Oct. 5, 2018, issued in connection with International Patent Application No. PCT/US2018/036007, filed Jun. 5, 2018, 14 pages.

*Primary Examiner* — Adam D Tissot
*Assistant Examiner* — Laura E Linhardt
(74) *Attorney, Agent, or Firm* — McDonnell Boehnen Hulbert & Berghoff LLP

(57) ABSTRACT

Described is a system comprising (a) a UAS registry including a plurality of UAS accounts, (b) a plurality of UAS registration computing systems operable to create UAS accounts for the UAS registry, (c) a plurality of USS computing systems that each provide service to one of a plurality of service areas within an airspace, wherein each USS computing system is operable to: (i) receive, from UAS operators, operation data for UASs operating in the service area served by the USS computing system, (ii) receive, from the other USS computing systems for the airspace, operation data for UASs operating in the other service areas served the other USS computing systems, (iii) combine the operation data received from the UAS operators, with the operation data received from the other USS computing systems, to maintain an airspace-wide UAS database, and (iv) provide a publicly accessible application interface based on the UAS database.

20 Claims, 13 Drawing Sheets

Related U.S. Application Data

(60) Provisional application No. 62/515,262, filed on Jun. 5, 2017.

(51) Int. Cl.
*G08G 5/02* (2006.01)
*G07B 15/00* (2011.01)
*H04L 67/12* (2022.01)
*G05D 1/00* (2006.01)
*H04L 67/52* (2022.01)

(52) U.S. Cl.
CPC .......... *G08G 5/006* (2013.01); *G08G 5/0013* (2013.01); *G08G 5/0026* (2013.01); *G08G 5/0069* (2013.01); *G08G 5/0082* (2013.01); *H04L 67/12* (2013.01); *H04L 67/52* (2022.05)

(56) References Cited

U.S. PATENT DOCUMENTS

| | | | |
|---|---|---|---|
| 2014/0257692 | A1 | 9/2014 | Stefani et al. |
| 2016/0189550 | A1 | 6/2016 | Chan et al. |
| 2016/0253907 | A1* | 9/2016 | Taveira .............. G07B 15/00 701/3 |
| 2016/0351057 | A1 | 12/2016 | Elmasry et al. |
| 2017/0358224 | A1* | 12/2017 | Priest ................. G08G 5/0069 |
| 2018/0355457 | A1 | 12/2018 | Dehuyser et al. |

FOREIGN PATENT DOCUMENTS

| | | |
|---|---|---|
| CN | 105227631 | 1/2016 |
| CN | 105913691 | 8/2016 |
| CN | 105913692 | 8/2016 |
| CN | 106297417 | 1/2017 |
| CN | 106412411 | 2/2017 |
| EP | 3101643 | 12/2016 |
| WO | 97/37336 | 10/1997 |
| WO | 2016/154949 | 10/2016 |
| WO | 2016/164892 | 10/2016 |

* cited by examiner

METHODS AND SYSTEMS FOR SHARING AN AIRSPACE WIDE UNMANNED AIRCRAFT SYSTEM DATABASE ACROSS A PLURALITY OF SERVICE SUPPLIERS

CROSS-REFERENCE TO RELATED APPLICATIONS

The present application is a continuation of U.S. patent application Ser. No. 15/997,556, filed on Jun. 4, 2018, which claims priority to U.S. Patent Application No. 62/515,262, filed on Jun. 5, 2017, the entire contents of which are herein incorporated by reference.

BACKGROUND

An unmanned aircraft system ("UAS"), which may also be referred to as an autonomous vehicle, is a vehicle capable of travel without a physically-present human operator. A UAS may operate in a remote-control mode, in an autonomous mode, or in a partially autonomous mode.

When a UAS operates in a remote-control mode, a pilot or driver that is at a remote location can control the UAS via commands that are sent to the UAS via a wireless link. When the UAS operates in autonomous mode, the UAS typically moves based on pre-programmed navigation waypoints, dynamic automation systems, or a combination of these. Further, some UASs can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of UASs exist for various different environments. For instance, UASs exist for operation in the air, on the ground, underwater, and in space. Examples include quad-copters and tail-sitter UASs, among others. UASs also exist for hybrid operations in which multi-environment operation is possible. Examples of hybrid UASs include an amphibious craft that is capable of operation on land as well as on water or a floatplane that is capable of landing on water as well as on land. Other examples are also possible.

SUMMARY

In one aspect, a system is provided. The system includes an unmanned aircraft system (UAS) registry comprising a plurality of UAS accounts, wherein each UAS account comprises (a) owner information data and (b) a unique UAS identifier. The system also includes a plurality of UAS registration computing systems operable to create UAS accounts for the UAS registry and control access to the plurality UAS accounts via an authentication process. The system also includes a plurality of UAS service supplier (USS) computing systems that each provide service to one of a plurality of service areas within an airspace. Each USS computing system is operable to: (a) receive, from UAS operators, operation data for UASs operating in the service area served by the USS computing system, wherein the received operation data identifies data for each UAS with a unique UAS identifier assigned to the UAS, (b) receive, from the other USS computing systems for the airspace, operation data for UASs operating in the other service areas served the other USS computing systems, wherein the operation data for the other service areas identifies data for each UAS with a unique UAS identifier assigned to the UAS, (c) combine (i) the operation data received from the UAS operators for the corresponding service area, with (ii) the operation data received from the other USS computing systems for the other service areas in the airspace, to maintain an airspace-wide UAS database, wherein the UAS database identifies operation data for each UAS comprising the unique UAS identifier assigned to the UAS, and (d) provide a publicly accessible application interface for obtaining airspace data based on the UAS database.

In another aspect, method operable by a plurality of UAS service supplier (USS) computing systems that each provide service to one of a plurality of unmanned aircraft system (UAS) service areas within an airspace is provided. The method includes (a) receiving, from UAS operators, operation data for UASs operating in the service area served by the USS computing system, wherein the received operation data identifies data for each UAS with a unique UAS identifier assigned to the UAS, (b) receiving, from the other USS computing systems for the airspace, operation data for UASs operating in the other service areas served the other USS computing systems, wherein the operation data for the other service areas identifies data for each UAS with a unique UAS identifier assigned to the UAS, (c) combining (i) the operation data received from the UAS operators for the corresponding service area, with (ii) the operation data received from the other USS computing systems for the other service areas in the airspace, to maintain an airspace-wide UAS database, wherein the UAS database identifies operation data for each UAS comprising the unique UAS identifier assigned to the UAS, and (d) providing a publicly accessible application interface for obtaining airspace data based on the UAS database.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
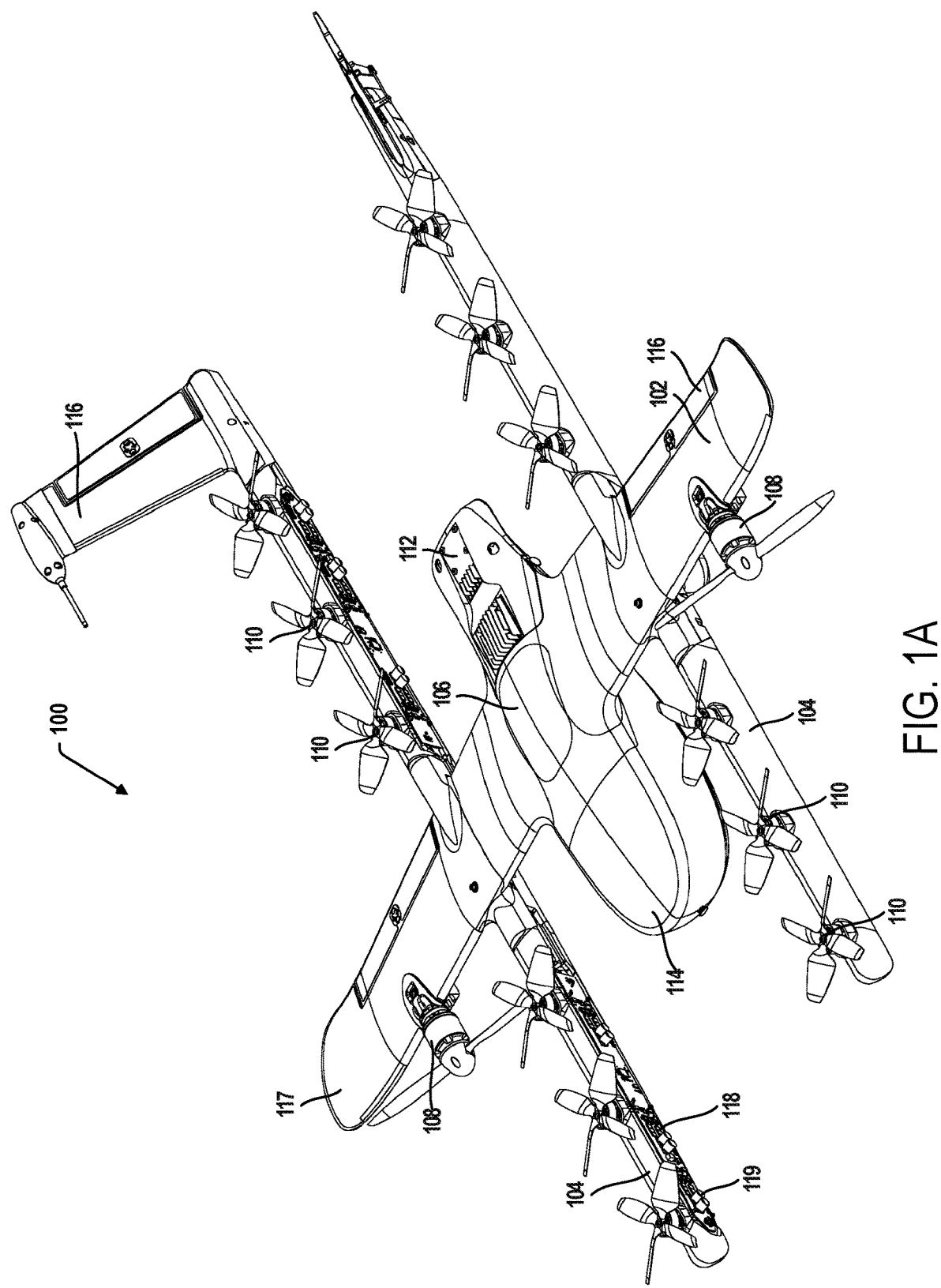
FIG. 1A is a simplified illustration of a UAS, according to an example implementation.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

Example implementations may relate to a registration and identity system to establish a traceable link between an unmanned aerial system (UAS) and a UAS owner when conducting flight operations in an airspace, thereby enabling public visibility of UAS operations while protecting owner privacy. Such a link would encourage responsible operations by establishing a currently-missing layer of accountability. This link could enable both public awareness of UAS operations, as well as increased monitoring, auditing, and enforcement capabilities. The system described herein establishes UAS user accounts with protected owner information (name, address, etc.), and a separate unique UAS identifier. This structure provides link between the private owner identity and the public unique UAS identifier provides a traceable and verifiable link between an operating UAS and a designated responsible entity.

In example embodiments, a system architecture includes a plurality of UAS service supplier (USS) computing systems that each provide service to one of a plurality of service areas within a larger airspace. Individual UAS operators can communicate with a USS system to provide operation data for a UAS they are operating in the USS system's service area. Further, the USS systems may have a federated architecture, and may all exchange data for their individual service areas with one other, so that each USS can maintain its own airspace-wide UAS database. Importantly, the USS organizes the UAS database using the unique UAS identifiers assigned to UASs operating in the airspace. As will be discussed in greater detail below, the use of unique UAS identifiers by USS systems, combined with separate systems that link each unique UAS identifier to corresponding owner information, allow for public access to certain UAS information that has not been available heretofore.

For example, a USS can provide a public interface (and perhaps an application programming interface (API)) that allows UAS operators and other members of the public to request or access information based on the UAS database for the airspace. This allows for a publicly accessible graphical user (GUI) interface in which a user can select a UAS on the GUI, and can receive the public unique UAS identifier. Such an arrangement also allows UAS operators to learn of and avoid/plan around other UASs operating nearby.

In a further aspect, an example system architecture includes a UAS registry (e.g., federated registrar systems) that stores owner identity information and provides traceable link to such owner identity information via the unique UAS identifiers. The UAS registry is separate database from UAS database. The system may also include a plurality of UAS registration computing systems operable to create UAS accounts for the UAS registry and control access to the plurality UAS accounts via an authentication process. Such a structure allows for public visibility of UAS operations (by way of the USS and public interface that only utilize unique UAS identifiers, separate from owner information), and facilitates monitoring and enforcement of airspace rules (by way of registry tracing unique UAS identifiers to corresponding owner information), while also protecting owner privacy (through separation of the registry that traces unique UAS identifiers to owner information, from the public-facing USS systems).

In addition, the federated USS architecture described above provides for redundant UAS databases. In particular, information received by one USS is shared with all other subscribing USSs, such that the state of the airspace can be known at all USS participants (even though each USS only serves a certain area in the larger airspace). Such an arrangement helps ensure that there is not a single point of failure, and enables independent implementations with different types of public access interfaces to the airspace-wide UAS data (e.g., a UAS serving an area with government-owned land might provide a customized interface for government officials, while a UAS serving another area without government-owned land might not).

II. Illustrative UASs

Herein, the terms "unmanned aircraft system" and "UAS" refer to any autonomous or semi-autonomous vehicle that is capable of performing some functions without a physically present human pilot.

A UAS can take various forms. For example, a UAS may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aircraft vehicle" (UAV), or "unmanned aerial system" (UAS) may also be used to refer to a UAS.

FIG. 1A is an isometric view of an example UAS 100. UAS 100 includes wing 102, booms 104, and a fuselage 106. Wings 102 may be stationary and may generate lift based on the wing shape and the UAS's forward airspeed. For instance, the two wings 102 may have an airfoil-shaped cross section to produce an aerodynamic force on UAS 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAS 100. Further, wings 102 may terminate in wing tips 117 for improved control of lift of the UAS.

In the illustrated configuration, UAS 100 includes a structural frame. The structural frame may be referred to as a "structural H-frame" or an "H-frame" (not shown) of the UAS. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAS 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAS. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAS. Furthermore, different types/models of fuselage 106 may be attached to the H-frame, therefore improving the modularity of the design. Such modularity allows these various parts of UAS 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAS. As a result, the UAS may have better dimensional accuracy and/or improved reliability.

Moreover, in at least some embodiments, the same H-frame may be used with the wing shell and/or boom shells having different size and/or design, therefore improving the modularity and versatility of the UAS designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAS 100 has four PCBs, but other numbers of PCBs are also possible. For example, UAS 100 may include two PCBs, one per the boom. The PCBs carry electronic components 119 including, for example, power converters, controllers, memory, passive components, etc. In operation, propulsion units 108 and 110 of UAS 100 are electrically connected to the PCBs.

Many variations on the illustrated UAS are possible. For instance, fixed-wing UASs may include more or fewer rotor units (vertical or horizontal), and/or may utilize a ducted fan or multiple ducted fans for propulsion. Further, UASs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAS 100 may be implemented with more or less of these components. For example, UAS 100 may include four wings 102, four booms 104, and more or less propulsion units (horizontal or vertical).

Figure 1B:
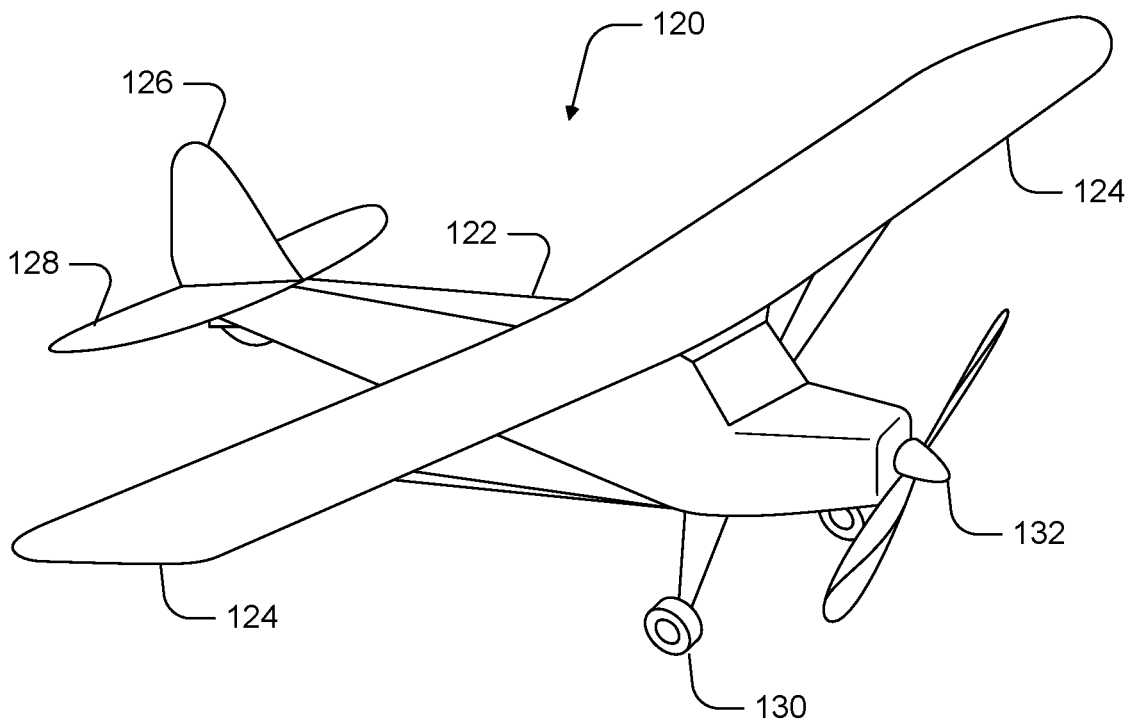
FIG. 1B is a simplified illustration of a UAS, according to an example implementation.

Similarly, FIG. 1B shows another example of a fixed-wing UAS 120. The fixed-wing UAS 120 includes a fuselage 122, two wings 124 with an airfoil-shaped cross section to provide lift for the UAS 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
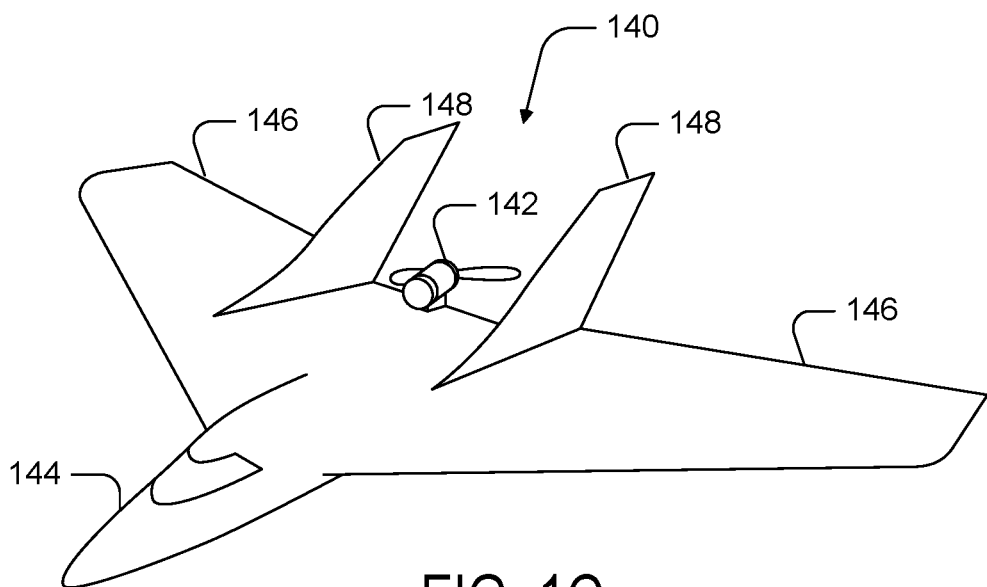
FIG. 1C is a simplified illustration of a UAS, according to an example implementation.

FIG. 1C shows an example of a UAS 140 with a propeller in a pusher configuration. The term "pusher" refers to the fact that a propulsion unit 142 is mounted at the back of the UAS and "pushes" the vehicle forward, in contrast to the propulsion unit being mounted at the front of the UAS. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
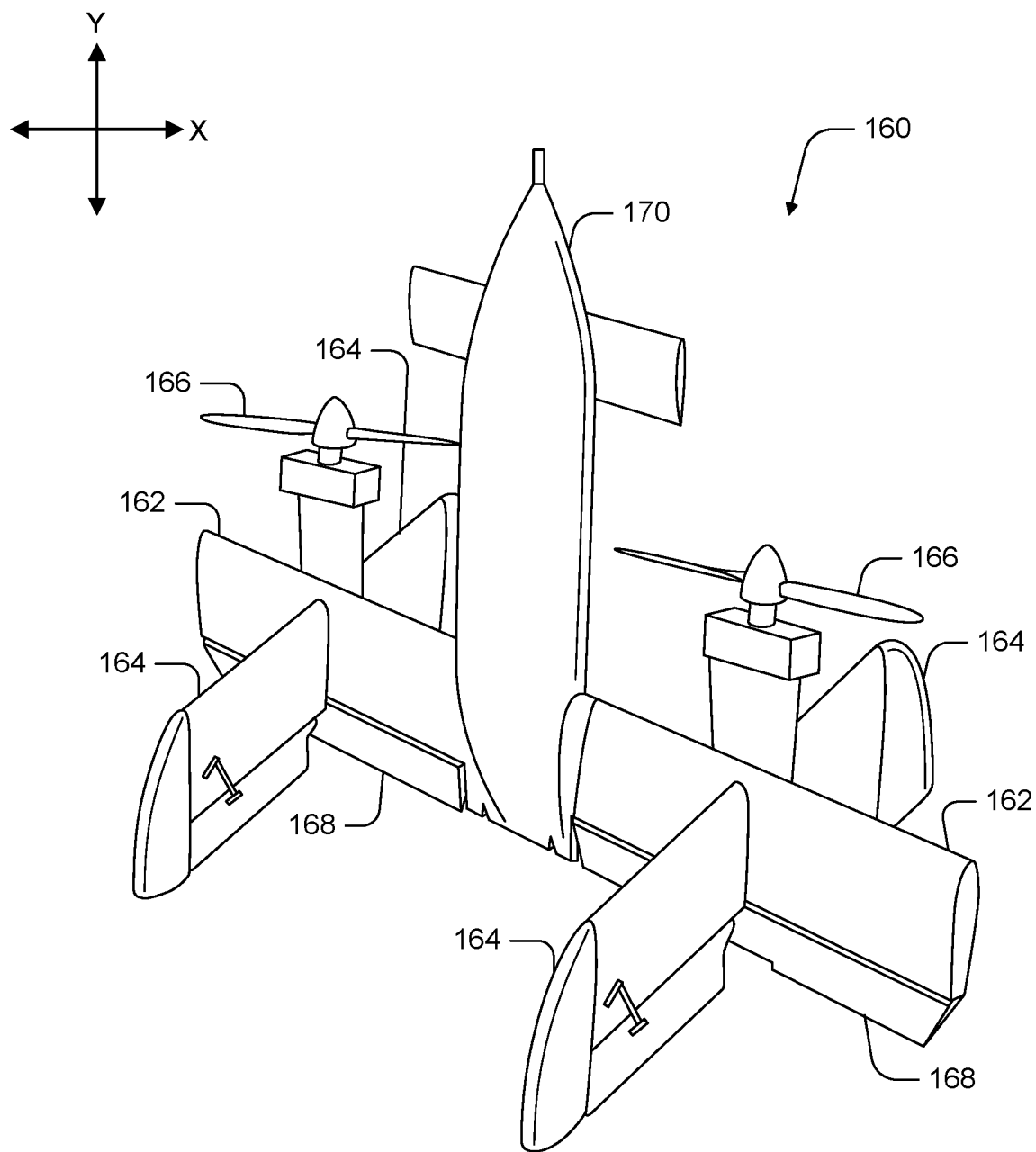
FIG. 1D is a simplified illustration of a UAS, according to an example implementation.

FIG. 1D shows an example of a tail-sitter UAS 160. In the illustrated example, the tail-sitter UAS 160 has fixed wings 162 to provide lift and allow the UAS 160 to glide horizontally (e.g., along the x-axis, in a position that is approximately perpendicular to the position shown in FIG. 1D). However, the fixed wings 162 also allow the tail-sitter UAS 160 to take off and land vertically on its own.

For example, at a launch site, the tail-sitter UAS 160 may be positioned vertically (as shown) with its fins 164 and/or wings 162 resting on the ground and stabilizing the UAS 160 in the vertical position. The tail-sitter UAS 160 may then take off by operating its propellers 166 to generate an upward thrust (e.g., a thrust that is generally along the y-axis). Once at a suitable altitude, the tail-sitter UAS 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAS 160 can fly in a similar manner as a typical airplane.

Many variations on the illustrated fixed-wing UASs are possible. For instance, fixed-wing UASs may include more or fewer propellers, and/or may utilize a ducted fan or multiple ducted fans for propulsion. Further, UASs with more wings (e.g., an "x-wing" configuration with four wings), with fewer wings, or even with no wings, are also possible.

Figure 1E:
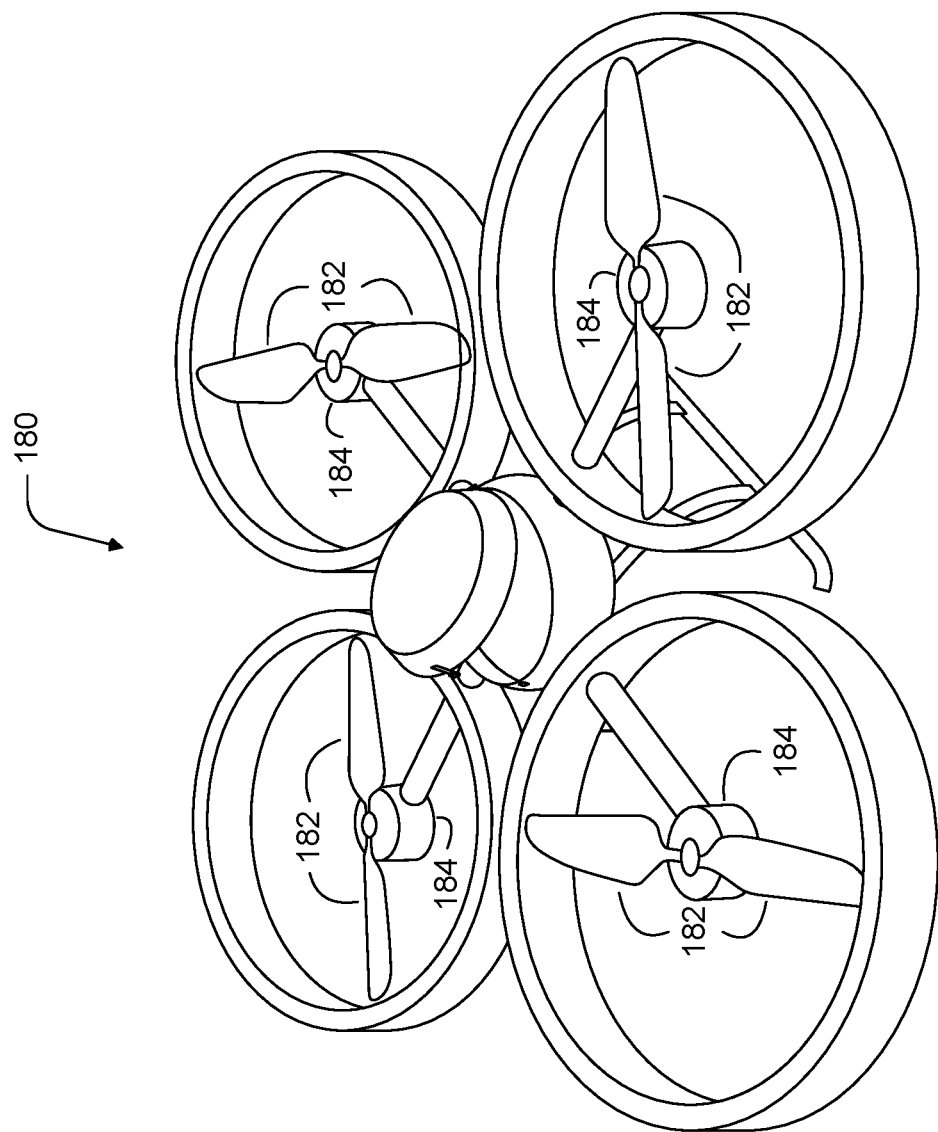
FIG. 1E is a simplified illustration of a UAS, according to an example implementation.

As noted above, some implementations may involve other types of UASs, in addition to or in the alternative to fixed-wing UASs. For instance, FIG. 1E shows an example of a rotorcraft that is commonly referred to as a multicopter 180. The multicopter 180 may also be referred to as a quadcopter, as it includes four rotors 182. It should be understood that example implementations may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAS can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some implementations, a UAS may be configured to allow a remote operator to take over functions that can otherwise be controlled autonomously by the UAS. Yet further, a given type of function may be controlled remotely at one level of abstraction and performed autonomously at another level of abstraction. For example, a remote operator could control high level navigation decisions for a UAS, such as by specifying that the UAS should travel from one location to another (e.g., from a warehouse in a suburban area to a delivery address in a nearby city), while the UAS's navigation system autonomously controls more fine-grained navigation decisions, such as the specific route to take between the two locations, specific flight controls to achieve the route and avoid obstacles while navigating the route, and so on.

More generally, it should be understood that the example UASs described herein are not intended to be limiting. Example implementations may relate to, be implemented within, or take the form of any type of unmanned aerial vehicle.

III. Illustrative UAS Components

Figure 2:
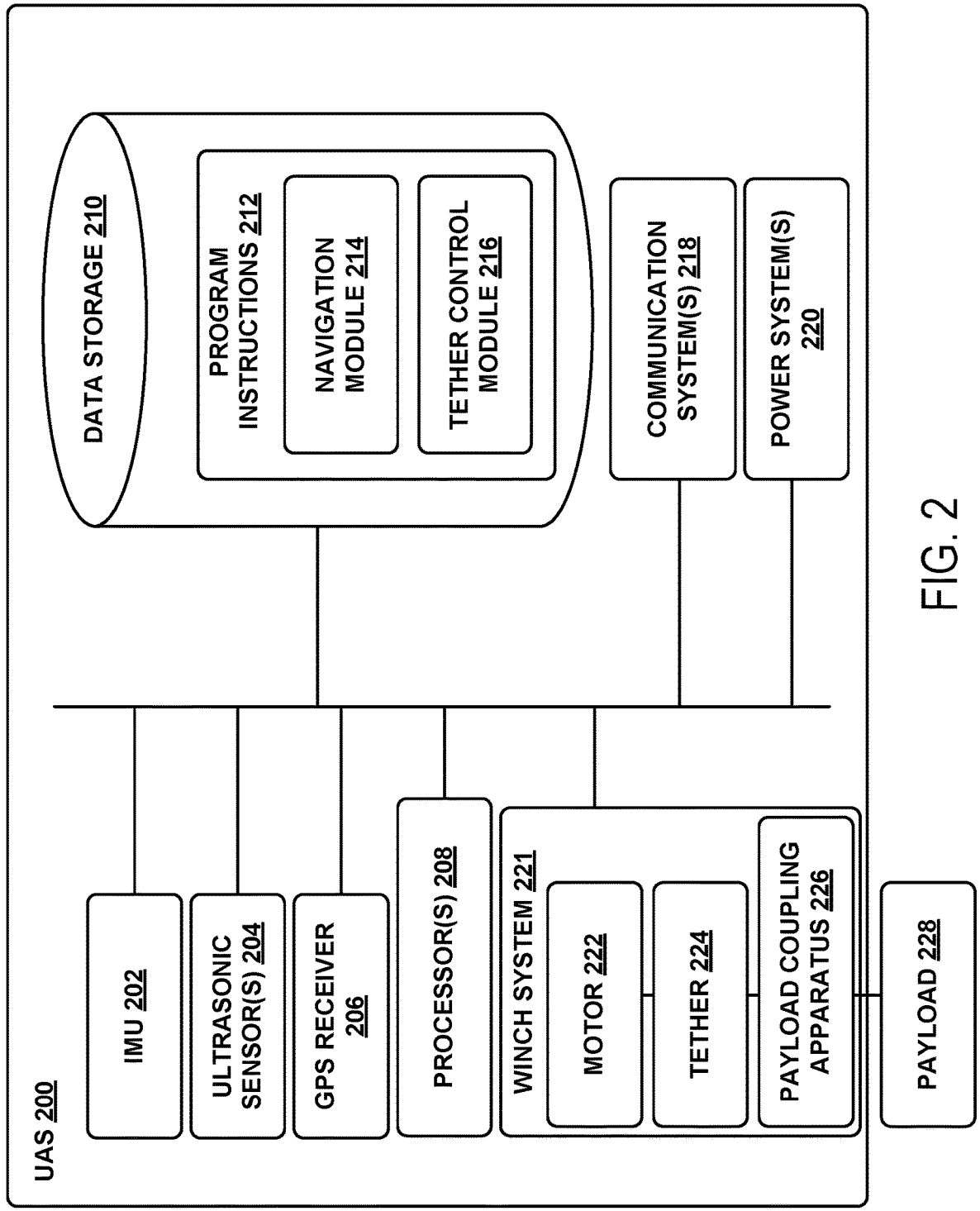
FIG. 2 is a simplified block diagram illustrating components of a UAS, according to an example implementation.

FIG. 2 is a simplified block diagram illustrating components of a UAS 200, according to an example implementation. UAS 200 may take the form of, or be similar in form to, one of the UASs 100, 120, 140, 160, and 180 described in reference to FIGS. 1A-1E. However, UAS 200 may also take other forms.

UAS 200 may include various types of sensors, and may include a computing device configured to provide the functionality described herein. In the illustrated implementation, the sensors of UAS 200 include an inertial measurement unit (IMU) 202, ultrasonic sensor(s) 204, and a GPS 206, among other possible sensors and sensing systems.

In the illustrated implementation, UAS 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAS described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some implementations, the data storage 210 can be implemented using a single physical device (e.g., one optical, magnetic, organic or other memory or disc storage unit), while in other implementations, the data storage 210 can be implemented using two or more physical devices.

As noted, the data storage 210 can include computer-readable program instructions 212 and perhaps additional data, such as diagnostic data of the UAS 200. As such, the data storage 210 may include program instructions 212 to perform or facilitate some or all of the UAS functionality described herein. For instance, in the illustrated implementation, program instructions 212 include a navigation module 214 and a tether control module 216.

A. Sensors

In an illustrative implementation, IMU 202 may include both an accelerometer and a gyroscope, which may be used together to determine an orientation of the UAS 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAS 200. Two examples of such sensors are magnetometers and pressure sensors. In some implementations, a UAS may include a low-power, digital 3-axis magnetometer, which can be used to realize an orientation independent electronic compass for accurate heading information. However, other types of magnetometers may be utilized as well. Other examples are also possible. Further, note that a UAS could include some or all of the above-described inertia sensors as separate components from an IMU.

UAS 200 may also include a pressure sensor or barometer, which can be used to determine the altitude of the UAS 200. Alternatively, other sensors, such as sonic altimeters or radar altimeters, can be used to provide an indication of altitude, which may help to improve the accuracy of and/or prevent drift of an IMU.

In a further aspect, UAS 200 may include one or more sensors that allow the UAS to sense objects in the environment. For instance, in the illustrated implementation, UAS 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for UASs or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some implementations, UAS 200 may also include one or more imaging system(s). For example, one or more still and/or video cameras may be utilized by UAS 200 to capture image data from the UAS's environment. As a specific example, charge-coupled device (CCD) cameras or complementary metal-oxide-semiconductor (CMOS) cameras can be used with UASs. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAS 200 may also include a GPS receiver 206. The GPS receiver 206 may be configured to provide data that is typical of well-known GPS systems, such as the GPS coordinates of the UAS 200. Such GPS data may be utilized by the UAS 200 for various functions. As such, the UAS may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAS 200 to, e.g., move about its environment and reach a desired location. To do so, the navigation module 214 may control the altitude and/or direction of flight by controlling the mechanical features of the UAS that affect flight (e.g., its rudder(s), elevator(s), aileron(s), and/or the speed of its propeller(s)).

In order to navigate the UAS 200 to a target location, the navigation module 214 may implement various navigation techniques, such as map-based navigation and localization-based navigation, for instance. With map-based navigation, the UAS 200 may be provided with a map of its environment, which may then be used to navigate to a particular location on the map. With localization-based navigation, the UAS 200 may be capable of navigating in an unknown environment using localization. Localization-based navigation may involve the UAS 200 building its own map of its environment and calculating its position within the map and/or the position of objects in the environment. For example, as a UAS 200 moves throughout its environment, the UAS 200 may continuously use localization to update its map of the environment. This continuous mapping process may be referred to as simultaneous localization and mapping (SLAM). Other navigation techniques may also be utilized.

In some implementations, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAS 200 to move from waypoint to waypoint, in order to ultimately travel to a final destination (e.g., a final waypoint in a sequence of waypoints).

In a further aspect, the navigation module 214 and/or other components and systems of the UAS 200 may be configured for "localization" to more precisely navigate to the scene of a target location. More specifically, it may be desirable in certain situations for a UAS to be within a threshold distance of the target location where a payload 228 is being delivered by a UAS (e.g., within a few feet of the target destination). To this end, a UAS may use a two-tiered approach in which it uses a more-general location-determination technique to navigate to a general area that is associated with the target location, and then use a more-refined location-determination technique to identify and/or navigate to the target location within the general area.

For example, the UAS 200 may navigate to the general area of a target destination where a payload 228 is being delivered using waypoints and/or map-based navigation. The UAS may then switch to a mode in which it utilizes a localization process to locate and travel to a more specific location. For instance, if the UAS 200 is to deliver a payload to a user's home, the UAS 200 may need to be substantially close to the target location in order to avoid delivery of the payload to undesired areas (e.g., onto a roof, into a pool, onto a neighbor's property, etc.). However, a GPS signal may only get the UAS 200 so far (e.g., within a block of the user's home). A more precise location-determination technique may then be used to find the specific target location.

Various types of location-determination techniques may be used to accomplish localization of the target delivery location once the UAS 200 has navigated to the general area of the target delivery location. For instance, the UAS 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAS 200 reaches the general area of the target delivery location (or of a moving subject such as a person or their mobile device), the UAS 200 may switch to a "fly-by-wire" mode where it is controlled, at least in part, by a remote operator, who can navigate the UAS 200 to the specific target location. To this end, sensory data from the UAS 200 may be sent to the remote operator to assist them in navigating the UAS 200 to the specific location.

As yet another example, the UAS 200 may include a module that is able to signal to a passer-by for assistance in reaching the specific target delivery location. For example, the UAS 200 may display a visual message requesting such assistance in a graphic display, with the visual message possibly indicating the specific target delivery location, among other possibilities. In another example, the UAS 200 may play an audio message or tone through speakers to indicate the need for such assistance, with the audio message or tone possibly indicating the specific target delivery location, among other possibilities. In practice, such a feature can be useful in a scenario in which the UAS is unable to use sensory functions or another location-determination technique to reach the specific target location. However, this feature is not limited to such scenarios.

In some implementations, once the UAS 200 arrives at the general area of a target delivery location, the UAS 200 may utilize a beacon from a user's remote device (e.g., the user's mobile phone) to locate the remote device, person, or location. Such a beacon may take various forms. As an example, consider the scenario where a remote device, such as the mobile phone of a person who requested a UAS delivery, is able to send out directional signals (e.g., via an RF signal, a light signal and/or an audio signal). In this scenario, the UAS 200 may be configured to navigate by "sourcing" such directional signals—in other words, by determining where the signal is strongest and navigating accordingly. As another example, a mobile device can emit a frequency, either in the human range or outside the human range, and the UAS 200 can listen for that frequency and navigate accordingly. As a related example, if the UAS 200 is listening for spoken commands, then the UAS 200 could utilize spoken statements, such as "I'm over here!" to source the specific location of the person requesting delivery of a payload.

In an alternative arrangement, a navigation module may be implemented at a remote computing device, which communicates wirelessly with the UAS 200. The remote computing device may receive data indicating the operational state of the UAS 200, sensor data from the UAS 200 that allows it to assess the environmental conditions being experienced by the UAS 200, and/or location information for the UAS 200. Provided with such information, the remote computing device may determine altitudinal and/or directional adjustments that should be made by the UAS 200 and/or may determine how the UAS 200 should adjust its mechanical features (e.g., its rudder(s), elevator(s), aileron(s), and/or the speed of its propeller(s)) in order to effectuate such movements. The remote computing device may then communicate such adjustments to the UAS 200 so it can move in the determined manner.

C. Communication Systems

In a further aspect, the UAS 200 includes one or more communication systems 218. The communications systems 218 may include one or more wireless interfaces and/or one or more wireline interfaces, which allow the UAS 200 to communicate via one or more networks. Such wireless interfaces may provide for communication under one or more wireless communication protocols, such as Bluetooth, WiFi (e.g., an IEEE 902.11 protocol), Long-Term Evolution (LTE), WiMAX (e.g., an IEEE 902.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some implementations, a UAS 200 may include communication systems 218 that allow for both short-range communication and long-range communication. For example, the UAS 200 may be configured for short-range communications using Bluetooth and for long-range communications under a CDMA protocol. In such an implementation, the UAS 200 may be configured to function as a "hot spot;" or in other words, as a gateway or proxy between a remote support device and one or more data networks, such as a cellular network and/or the Internet. Configured as such, the UAS 200 may facilitate data communications that the remote support device would otherwise be unable to perform by itself.

For example, the UAS 200 may provide a WiFi connection to a remote device, and serve as a proxy or gateway to a cellular service provider's data network, which the UAS might connect to under an LTE or a 3G protocol, for instance. The UAS 200 could also serve as a proxy or gateway to a high-altitude balloon network, a satellite network, or a combination of these networks, among others, which a remote device might not be able to otherwise access.

D. Power Systems

In a further aspect, the UAS 200 may include power system(s) 220. The power system 220 may include one or more batteries for providing power to the UAS 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAS 200 may employ various systems and configurations in order to transport and deliver a payload 228. In some implementations, the payload 228 of a given UAS 200 may include or take the form of a "package" designed to transport various goods to a target delivery location. For example, the UAS 200 can include a compartment, in which an item or items may be transported. Such a package may one or more food items, purchased goods, medical items, or any other object(s) having a size and weight suitable to be transported between two locations by the UAS. In other implementations, a payload 228 may simply be the one or more items that are being delivered (e.g., without any package housing the items).

In some implementations, the payload 228 may be attached to the UAS and located substantially outside of the UAS during some or all of a flight by the UAS. For example, the package may be tethered or otherwise releasably attached below the UAS during flight to a target location. In an implementation where a package carries goods below the UAS, the package may include various features that protect its contents from the environment, reduce aerodynamic drag on the system, and prevent the contents of the package from shifting during UAS flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAS. This may move some of the frontal area and volume of the package away from the wing(s) of the UAS, thereby preventing the reduction of lift on the wing(s) cause by the package. Yet further, in some implementations, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAS and may cause the contents of the package to shift less during flight.

In order to deliver the payload, the UAS may include a winch system 221 controlled by the tether control module 216 in order to lower the payload 228 to the ground while the UAS hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAS. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some implementations, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAS 200 may include friction pads that can apply a variable amount of pressure to the tether 224. As another example, the UAS 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some implementations, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAS 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAS 200.

In some implementations, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAS 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAS 200 after retracting the tether 224. Other examples are possible as well.

During delivery of the payload 228, the payload coupling apparatus 226 can be configured to secure the payload 228 while being lowered from the UAS by the tether 224, and can be further configured to release the payload 228 upon reaching ground level. The payload coupling apparatus 226 can then be retracted to the UAS by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAS. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAS upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAS and/or a control system over a wireless link and used to help in determining when the release mechanism has reached ground level (e.g., by detecting a measurement with the accelerometer that is characteristic of ground impact). In other examples, the UAS may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAS 200 could include an air-bag drop system or a parachute drop system. Alternatively, a UAS 200 carrying a payload could simply land on the ground at a delivery location. Other examples are also possible.

IV. Illustrative UAS Deployment Systems

Figure 3:
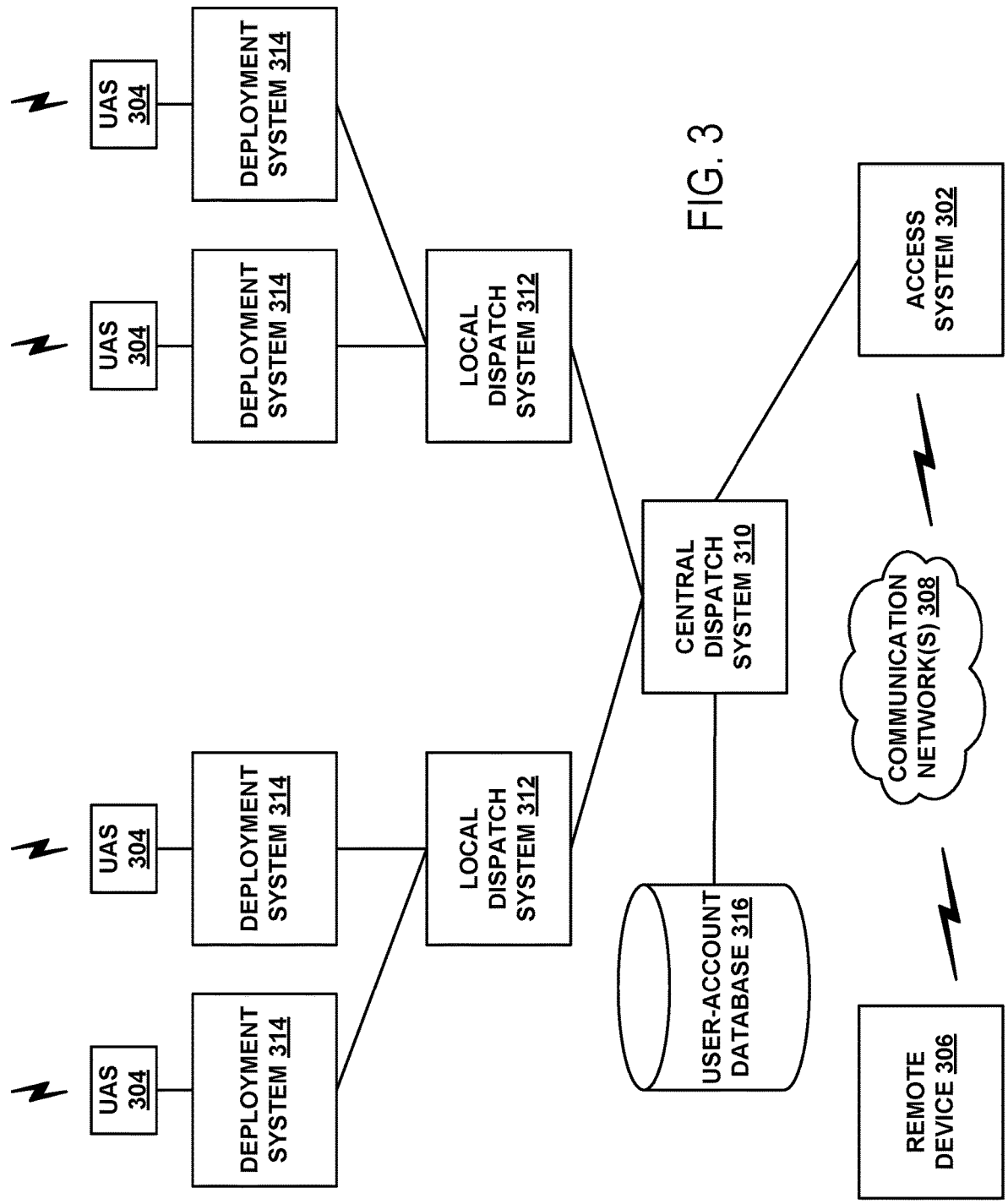
FIG. 3 is a simplified block diagram illustrating a UAS deployment system, according to an example implementation.

UAS deployment systems may be implemented in order to provide various UAS-related services. In particular, UASs may be provided at a number of different launch sites that may be in communication with regional and/or central control systems. Such a distributed UAS deployment system may allow UASs to be quickly deployed to provide services across a large geographic area (e.g., that is much larger than the flight range of any single UAS). For example, UASs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAS deployment system 300, according to an example implementation.

In the illustrative UAS deployment system 300, an access system 302 may allow for interaction with, control of, and/or utilization of a network of UASs 304. In some implementations, an access system 302 may be a computing device that allows for human-controlled dispatch of UASs 304. As such, the control system may include or otherwise provide a user interface through which a user can access and/or control the UASs 304.

In some implementations, dispatch of the UASs 304 may additionally or alternatively be accomplished via one or more automated processes. For instance, the access system 302 may dispatch one of the UASs 304 to transport a payload to a target location, and the UAS may autonomously navigate to the target location by utilizing various on-board sensors, such as a GPS receiver and/or other various navigational sensors.

Further, the access system 302 may provide for remote operation of a UAS. For instance, the access system 302 may allow an operator to control the flight of a UAS via its user interface. As a specific example, an operator may use the access system 302 to dispatch a UAS 304 to a target location. The UAS 304 may then autonomously navigate to the general area of the target location. At this point, the operator may use the access system 302 to take control of the UAS 304 and navigate the UAS to the target location (e.g., to a particular person to whom a payload is being transported). Other examples of remote operation of a UAS are also possible.

In an illustrative implementation, the UASs 304 may take various forms. For example, each of the UASs 304 may be a UAS such as those illustrated in FIGS. 1A-1E. However, UAS deployment system 300 may also utilize other types of UASs without departing from the scope of the invention. In some implementations, all of the UASs 304 may be of the same or a similar configuration. However, in other implementations, the UASs 304 may include a number of different types of UASs. For instance, the UASs 304 may include a number of types of UASs, with each type of UAS being configured for a different type or types of payload delivery capabilities.

The UAS deployment system 300 may further include a remote device 306, which may take various forms. Generally, the remote device 306 may be any device through which a direct or indirect request to dispatch a UAS can be made. (Note that an indirect request may involve any communication that may be responded to by dispatching a UAS, such as requesting a package delivery). In an example implementation, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some implementations, the remote device 306 may be configured to allow a user to request delivery of one or more items to a desired location. For example, a user could request UAS delivery of a package to their home via their mobile phone, tablet, or laptop. As another example, a user could request dynamic delivery to wherever they are located at the time of delivery. To provide such dynamic delivery, the UAS deployment system 300 may receive location information (e.g., GPS coordinates, etc.) from the user's mobile phone, or any other device on the user's person, such that a UAS can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UASs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UASs 304 from a number of different local dispatch systems 312. As such, the central dispatch system 310 may keep track of which UASs 304 are located at which local dispatch systems 312, which UASs 304 are currently available for deployment, and/or which services or operations each of the UASs 304 is configured for (in the event that a UAS fleet includes multiple types of UASs configured for different services and/or operations). Additionally or alternatively, each local dispatch system 312 may be configured to track which of its associated UASs 304 are currently available for deployment and/or are currently in the midst of item transport.

In some cases, when the central dispatch system 310 receives a request for UAS-related service (e.g., transport of an item) from the access system 302, the central dispatch system 310 may select a specific UAS 304 to dispatch. The central dispatch system 310 may accordingly instruct the local dispatch system 312 that is associated with the selected UAS to dispatch the selected UAS. The local dispatch system 312 may then operate its associated deployment system 314 to launch the selected UAS. In other cases, the central dispatch system 310 may forward a request for a UAS-related service to a local dispatch system 312 that is near the location where the support is requested and leave the selection of a particular UAS 304 to the local dispatch system 312.

In an example configuration, the local dispatch system 312 may be implemented as a computing device at the same location as the deployment system(s) 314 that it controls. For example, the local dispatch system 312 may be implemented by a computing device installed at a building, such as a warehouse, where the deployment system(s) 314 and UAS(s) 304 that are associated with the particular local dispatch system 312 are also located. In other implementations, the local dispatch system 312 may be implemented at a location that is remote to its associated deployment system(s) 314 and UAS(s) 304.

Numerous variations on and alternatives to the illustrated configuration of the UAS deployment system 300 are possible. For example, in some implementations, a user of the remote device 306 could request delivery of a package directly from the central dispatch system 310. To do so, an application may be implemented on the remote device 306 that allows the user to provide information regarding a requested delivery, and generate and send a data message to request that the UAS deployment system 300 provide the delivery. In such an implementation, the central dispatch system 310 may include automated functionality to handle requests that are generated by such an application, evaluate such requests, and, if appropriate, coordinate with an appropriate local dispatch system 312 to deploy a UAS.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UASs 304. Such launch systems may include features that provide for an automated UAS launch and/or features that allow for a human-assisted UAS launch. Further, the deployment systems 314 may each be configured to launch one particular UAS 304, or to launch multiple UASs 304.

The deployment systems 314 may further be configured to provide additional functions, including for example, diagnostic-related functions such as verifying system functionality of the UAS, verifying functionality of devices that are housed within a UAS (e.g., a payload delivery apparatus), and/or maintaining devices or other items that are housed in the UAS (e.g., by monitoring a status of a payload such as its temperature, weight, etc.).

In some implementations, the deployment systems 314 and their corresponding UASs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UASs may be installed in various locations. Such kiosks may include UAS launch systems, and may allow a user to provide their package for loading onto a UAS and pay for UAS shipping services, among other possibilities. Other examples are also possible.

In a further aspect, the UAS deployment system 300 may include or have access to a user-account database 316. The user-account database 316 may include data for a number of user accounts, and which are each associated with one or more person. For a given user account, the user-account database 316 may include data related to or useful in providing UAS-related services. Typically, the user data associated with each user account is optionally provided by an associated user and/or is collected with the associated user's permission.

Further, in some implementations, a person may be required to register for a user account with the UAS deployment system 300, if they wish to be provided with UAS-related services by the UASs 304 from UAS deployment system 300. As such, the user-account database 316 may include authorization information for a given user account (e.g., a username and password), and/or other information that may be used to authorize access to a user account.

In some implementations, a person may associate one or more of their devices with their user account, such that they can access the services of UAS deployment system 300. For example, when a person uses an associated mobile phone, e.g., to place a call to an operator of the access system 302 or send a message requesting a UAS-related service to a dispatch system, the phone may be identified via a unique device identification number, and the call or message may then be attributed to the associated user account. Other examples are also possible.

V. Illustrative Methods

As noted, disclosed herein is a method for verifying an identity of a UAS. The method may be performed by a server, by a computing device, by the UAS, by a UAS detection system, or by a combination thereof. The server could be incorporated as part of the access system 302, the central dispatch system 310, the local dispatch system 312, and/or the deployment system 314, among other options. In practice, the computing device could be a remote device, such as remote device 306 for instance, that is in communication with the server at issue. Thus, the server could have access to account information (e.g., stored in user-account database 316) associated with the computing device at issue, such as information about the source location associated with the computing device and/or information about items (e.g., respective weights of items) associated with the source location, among others. Yet further, in some implementations, the server and the computing device could be incorporated into a single system or device. Note that the server and the computing device are described in more detail below.

Figure 4:
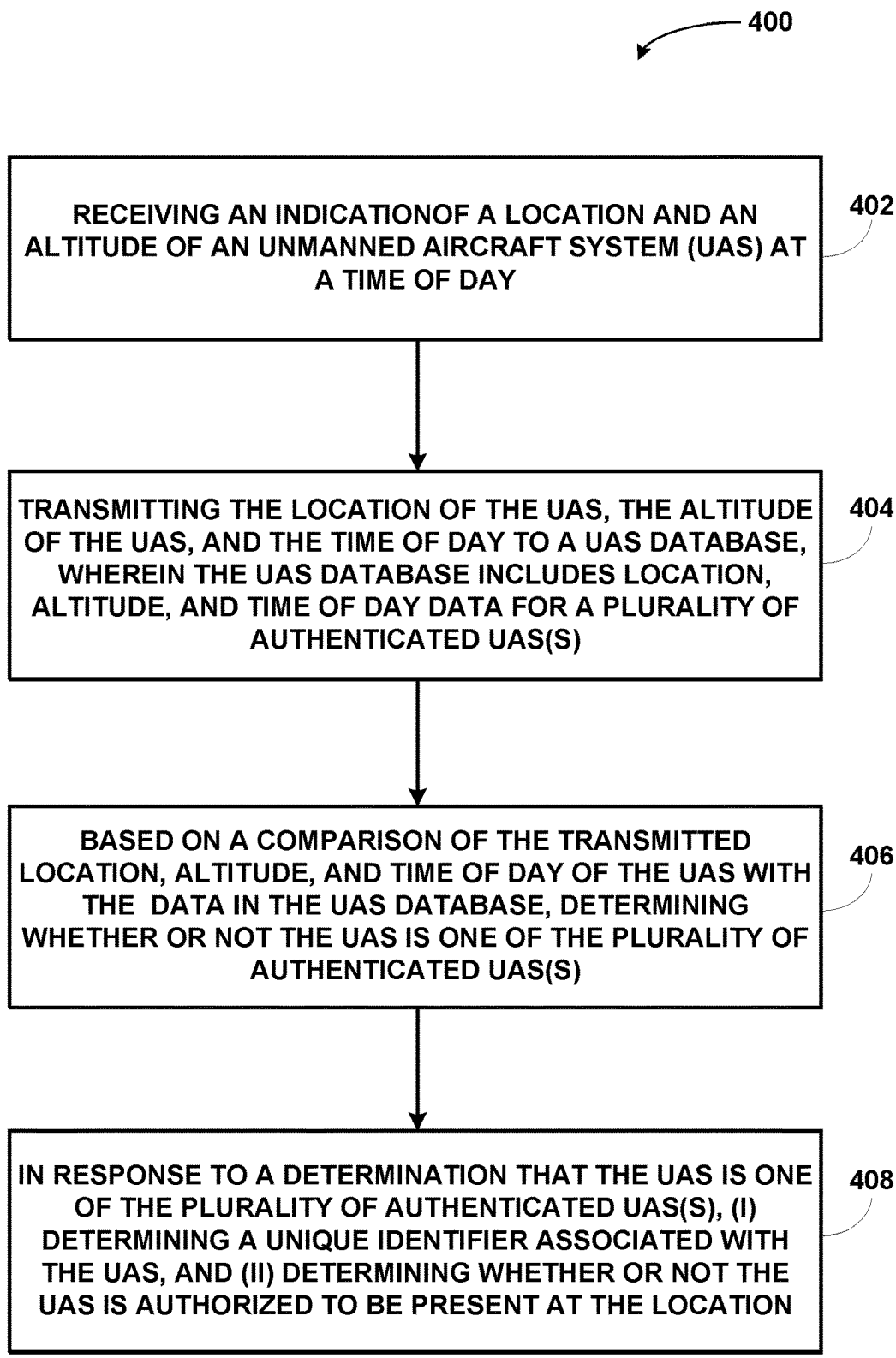
FIG. 4 illustrates an example flowchart for verifying an identity of a UAS, according to an example implementation.

FIG. 4 is a flowchart illustrating a method 400, according to an example implementation. Illustrative methods, such as method 400, may be carried out in whole or in part within an arrangement involving, for example, the computing device 700 of FIG. 7 and/or the server 800 of FIG. 8 (or more particularly by one or more components or subsystems thereof, such as by a processor and a non-transitory computer-readable medium having instructions that are executable to cause a system to perform functions described herein). However, it should be understood that example methods, such as method 400, may be carried out by other entities or combinations of entities as well as in other arrangements, without departing from the scope of the disclosure.

Method 400 and other processes and methods disclosed herein may include one or more operations, functions, or actions as illustrated by one or more of blocks 402-408 for instance. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 400 and other processes and methods disclosed herein, each block in FIG. 4 may represent circuitry that is wired to perform the specific logical functions in the process.

At block 402, method 400 involves receiving an indication of a location and an altitude of a UAS at a time of day. In one example, a computing device may receive the indication of the location and altitude of the UAS from the UAS itself. In another example, a UAS detection system including radar or some other detecting means may detect the location and altitude of the UAS and transmit the detected location and altitude to the computing device. In another example, a user may input a location, altitude, and time of day information of the UAS into a graphical user interface on the computing device. Other examples are possible as well.

In yet another example, determining the location of the UAS comprises determining the location of the UAS with respect to a geofence. A geofence is a virtual region specified in relation to a corresponding geographical region. For example, a geofence that encircles at least part of an increased authorization location can be specified with a latitude and longitude pair and a given radius. In other examples, polygons, such as triangles or rectangles, or other shapes can be used to specify a geofence. In such an example, the method 400 may further involve detecting a breach of the geofence in response to detection that the UAS has entered or exited a region bounded by the geofence.

At block 404, the method 400 involves transmitting the location of the UAS, the altitude of the UAS, and the time of day to a UAS database. In one example, the UAS database includes UAS operation data including location, altitude, and time of day data for a plurality of authenticated UASs. In another example, the UAS database includes additional information, such as owner information for the UAS and flight plan information. Other information may also be included in the UAS database. A UAS becomes authenticated when it is registered with a UAS registrar, as discussed in additional detail below. Such an authenticated UAS is then added to the UAS database and assigned a unique UAS identifier associated with the UAS. An authenticated UAS may then provide flight information to the UAS database (e.g., real-time position and operating data).

At block 406, the method 400 involves determining whether or not the UAS is one of the plurality of authenticated UASs based on a comparison of the transmitted location, altitude, and time of day of the UAS with the data in the UAS database. In particular, if the transmitted location, altitude, and time of day of the UAS matches with a location, altitude, and time of day data of a UAS in the UAS database, then a determination can be made that the UAS is authenticated. In contrast, if the transmitted location, altitude, and time of day of the UAS does not match with location, altitude, and time of day data for any UASs in the UAS database, then a determination can be made that the UAS is not authenticated. If it is determined that the UAS is not authenticated, then the method 400 may further involve providing for display of an alarm message or other form of alert. Such an alarm message or alert may include an audio component in addition to a visual component.

At block 408, the method 400 involves, in response to a determination that the UAS is one of the plurality of authenticated UASs, (i) determining a unique UAS identifier associated with the UAS, and (ii) determining whether or not the UAS is authorized to be present at the location. The unique UAS identifier may be a unique identification number, or may be alphanumeric. In one example, the determined UAS identity may then be transmitted to the computing device for display on a graphical user interface. In such an example, the unique UAS identifier may be displayed to identify the UAS. In another example, an authorized user (e.g., a public safety body or regulatory body) may request further information associated with the unique UAS identifier of the identified UAS. For example, a separate database may determine and convey information that relates the unique UAS identifier to the UAS owner and/or the UAS operator.

The determination of whether or not the UAS is authorized to be present at the location may take a variety of forms. In one example, determining whether or not the UAS is authorized to be present at the location comprises comparing the determined operator of the UAS with a unique UAS identifier whitelist. The unique UAS identifier whitelist comprises a list of one or more unique UAS identifiers associated with one or more UASs that are authorized to operate at the location. If stored local to the computing device, the unique UAS identifier whitelist may be stored in a local volatile or non-volatile memory of the computing device. In such an embodiment, a registered user may populate the unique UAS identifier whitelist with unique UAS identifiers associated with UASs that are authorized to operate at the location. In the event that the whitelist is stored remote from the computing device, the unique UAS identifier whitelist may allow a registered user to remotely access and populate the unique UAS identifier whitelist. Alternatively, the computing device may retrieve the remotely-stored unique UAS identifier whitelist via a file transfer connection. Other possibilities exist as well.

In another example, the method 400 further involves, in response to a determination that the UAS is one of the plurality of authenticated UASs, determining an operator of the UAS. The operator information may be associated with the determined unique UAS identifier. An operator of the UAS is the entity actually conducting operation of the UAS in the airspace. In most cases, the registered owner and operator of the UAS will be one and the same, however there are many use-cases where the operator is a distinct entity (e.g., rentals, leasing, etc.). Special authorization may be required to access operator data, such as regulatory body or public safety agency. As such, the general public does not have access to the operator information associated with the determined unique UAS identifier. In one example, determining whether or not the UAS is authorized to be present at the location comprises comparing the determined operator of the UAS with an operator whitelist, where the operator whitelist comprises a list of one or more operators authorized to operate UASs at the location. For example, if the determined operator is a large, well-known global company that frequently uses UASs to deliver their goods, then such an operator may be added to the operator whitelist. Other examples for determining whether or not the UAS is authorized to be present at the location are possible as well.

The method 400 may further involve, in response to a determination that the UAS is not one of the plurality of authenticated UASs, providing for display of an alert. Such an alert may be displayed on a graphical user interface of the computing device, for example. Further, such an alarm message may include both an audio component and a visual component.

The method 400 may further involve, in response to a determination that the UAS is one of the plurality of authenticated UASs, deleting data corresponding to the location of the UAS, the altitude of the UAS, and the time of day of the UAS. As such, the system may only have the UAS data for only enough time to verify the identity of the UAS and verify that the UAS is authorized to operate at the location, and then deletes the UAS data.

VI. Increased Authorization Location Example

Figure 5:
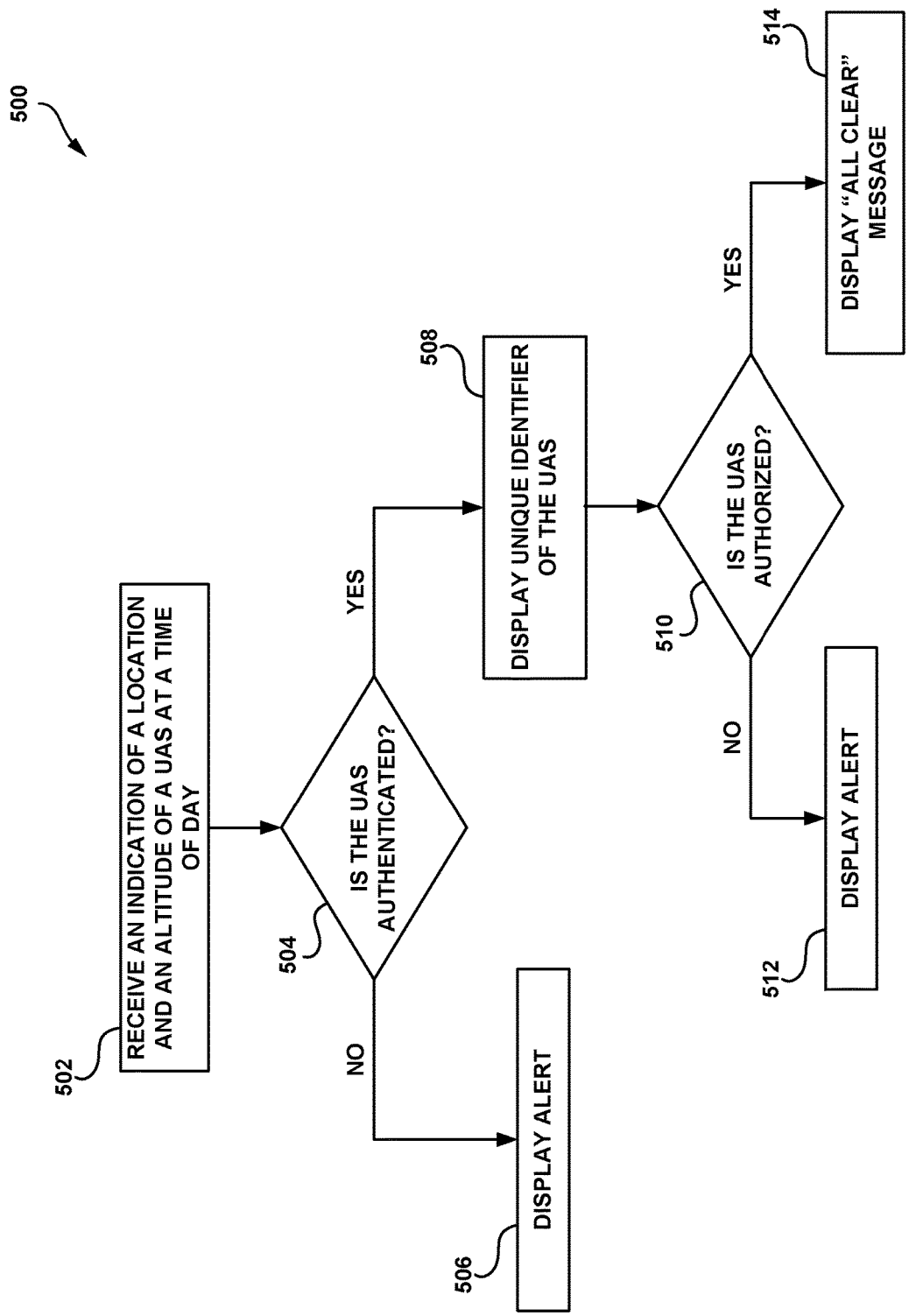
FIG. 5 shows a state diagram illustrating operations carried out by a computing device and/or a server, according to an example implementation.

FIG. 5 next shows a state diagram 500 illustrating some of the operations that the computing device and/or the server may carry out in accordance with the present disclosure, such as those introduced by the method 400 above, among others. Although the present disclosure is often described herein in reference to the state diagram 500, it should be understood that state diagram 500 is not meant to be limiting. For example, although various states are illustrated in a particular order, these states may also occur in a different order than that described herein. Furthermore, certain states may be combined into fewer states, divided into additional states, and/or removed based upon the desired implementation.

As discussed above, certain increased authorization locations may be particularly sensitive to UAS traffic, such as correctional facilities, national parks, airports, or stadiums, as examples. Such increased authorization locations may include UAS detection systems (e.g., radar) to help identify UASs that approach or enter their airspace. When such a UAS detection system detects a UAS at a particular location, having a particular altitude, at a particular time of day, that information may be compared with the UAS tracking data in the UAS database to determine whether or not the UAS is authenticated (e.g., registered). However, just because a UAS is authenticated does not mean that the UAS is authorized to be operating in that particular location. Therefore, if it is determined that the UAS is authenticated, the UAS detection system may determine the unique UAS identifier associated with the UAS, and further determine whether or not the UAS is authorized to be present at the location.

At state 502, an indication of a location and an altitude of a UAS at a time of day is received by a computing device. As discussed above, the computing device may receive the indication of the location and altitude of the UAS from the UAS itself, from a UAS detection system including radar or some other detecting means, or a user may input a location, altitude, and time of day information of the UAS into a graphical user interface on the computing device. At state 504, the computing device determines whether or not the UAS is authenticated, as discussed above. The computing device may make the determination of whether or not the UAS is authenticated using any of the examples described above in relation to method 400. If the computing device determines that the UAS is not authenticated, then the computing device may display an alert, as shown at state 506. If the computing device determines that the UAS is authenticated, then the computing device may display a unique UAS identifier of the UAS, as shown at state 508.

At state 510, the computing device further determines whether or not the UAS is authorized to operate at the location. The computing device may make the determination of whether or not the UAS is authorized to operate at the location using any of the examples described above in relation to method 400. If the computing device determines that the UAS is not authorized to operate at the location, then the computing device may display an alert, as shown at state 512. If the computing device determines that the UAS is authorized to operate at the location, then the computing device may display an "all clear" message, as shown at state 514.

VII. UAS Network Architecture

The initial phase of UAS airspace identity is registration: the capture, verification, and management of identity information for both owners and UASs. This information helps to provide a link between an operating UAS and a designated responsible party. To manage the processing of this information across participating parties, wa network of independent UAS registrars may be utilized.

Figure 6A:
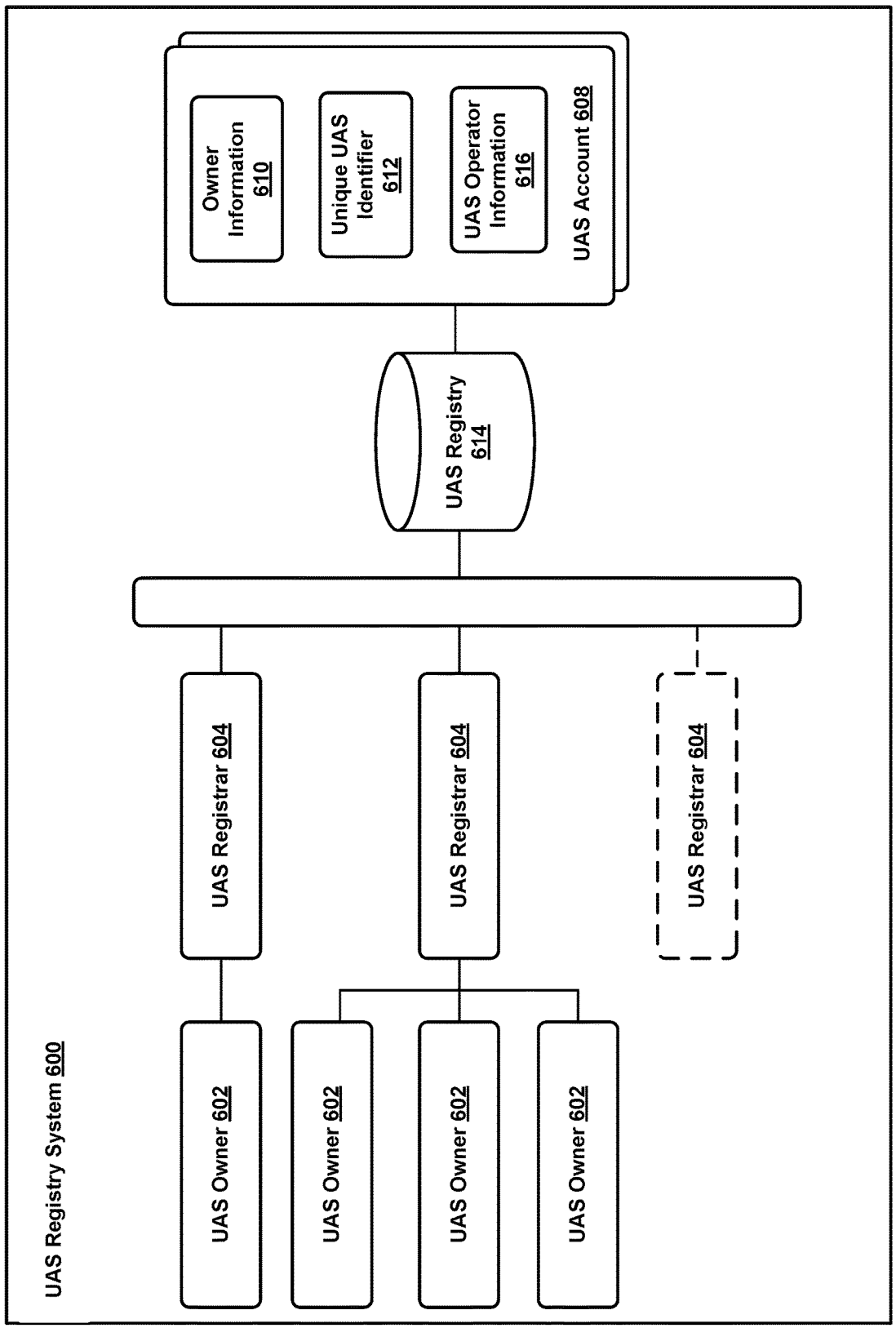
FIG. 6A illustrates an example architecture for a UAS registry system, according to an example embodiment.

FIG. 6A illustrates an example architecture for a UAS registry system 600, according to an example embodiment. As shown in FIG. 6A, the UAS registry system 600 may include a plurality of UAS owners 602 that register their UASs with one or a plurality of registrars 604. An owner 602 refers to UAS owners at all levels, from hobbyists to large-scale commercial services. An owner 602 could be a single person with a single UAS, or a company with a fleet of thousands of UAS.

The plurality of registrars 604 may comprise a plurality of UAS registration computing systems operable to: (i) creation and management of UAS accounts 608, (ii) capture, verification, and validation of UAS owner information 610, (iii) assignment and management of unique UAS identifiers 612, and (iv) federation of UAS account data between the registrar 604 and a central UAS registry 614. Any interested entity could implement a UAS registrar 604, provided they comply with a registrar accreditation agreement defining minimum criteria for participation. A cooperative network of registrars 604 helps ensure no single point of failure in the registration and identity system, and potentially allows for "value-added" services (e.g. fleet management, airspace route management, etc). In serving registration requests, the registrars 604 would interface with the centralized UAS registry 614 operated by an appropriate regulatory body.

As shown in FIG. 6A, the UAS account 608 may include owner information 610 corresponding to a particular UAS owner 602. Owner information 610 is personally identifiable information (PII) provided by the UAS owner 602 during registration. This information could include items such as: legal name, phone number, mailing address, email address, as examples. The information provided should be sufficient to enable identification, and provide a valid point of contact for a responsible party during UAS operations (e.g., phone number, mailing address). Verification and validation of the provided information is strongly encouraged, as this helps to prevent deliberate misuse of the system. Validation could be achieved through various means, such as challenge-response (e.g. via SMS, email, or physical mail), or through a third party (e.g. credit card or bank account). Failure by the registrant (UAS owner 602) to provide verification within a reasonable timeframe should lead to suspension or termination of the registration. Periodic verification of owner information 610 (e.g. yearly) may be required by the registrar 604, to ensure ongoing accuracy.

The UAS account 608 enable the UAS owner 602 to manage and validate their provided owner information 610, and manage their assigned unique UAS identifier 612 with their chosen UAS registrar 602. Access to an UAS Account may be protected via an authentication process, such as a login and password. In one example, the authentication process requires an implementation of two-factor authentication (e.g. via SMS or authenticator application). The UAS account 608 is the interface through which a UAS owner 602 may provide vehicle information, as well as transfer ownership of a unique UAS identifier 612 to another UAS owner. This interface also enables the UAS owner 602 to grant use permissions to a UAS operator for a given unique UAS identifier 612. The UAS account 608 may also include UAS operator information. An operator of the UAS is the entity actually conducting operation of the UAS in the airspace. In most cases, the registered UAS owner 602 and operator of the UAS will be one and the same, however there are many use-cases where the operator is a distinct entity (e.g., rentals, leasing, etc.).

Once a UAS owner 602 is registered by the UAS registrar 604, the UAS may be assigned the unique UAS identifier 612. The unique UAS identifiers 612 are globally unique, human-readable identifiers used to publicly identify an operating UAS, traceable to a given owner through the UAS registry 614. The unique UAS identifier 612 may be a unique identification number, or may be alphanumeric. The unique UAS identifier 612 may be physically affixed to the UAS, and may optionally be broadcast via an RF technology (e.g. ADS-B, or similar). The unique UAS identifier 612 may also be linked to a specific vehicle's manufacturer identity (e.g. serial number). The UAS registry 614 may include a plurality of such registered UASs, and their associated unique UAS identifiers 612. A given UAS owner 602 may be assigned one or more unique UAS identifiers 612, depending on their operational needs. For example, a hobbyist with several UASs could be assigned a single unique UAS identifier 612. In this case, the UAS owner 602 may only operate a single UAS with that unique UAS identifier 612 at a given time. In another example, a larger-scale operator may have many unique UAS identifiers 612, assignable to any vehicle in their fleet. They may conduct operations with several vehicles simultaneously, each with a separate unique UAS identifier 612 during operations.

Figure 6B:
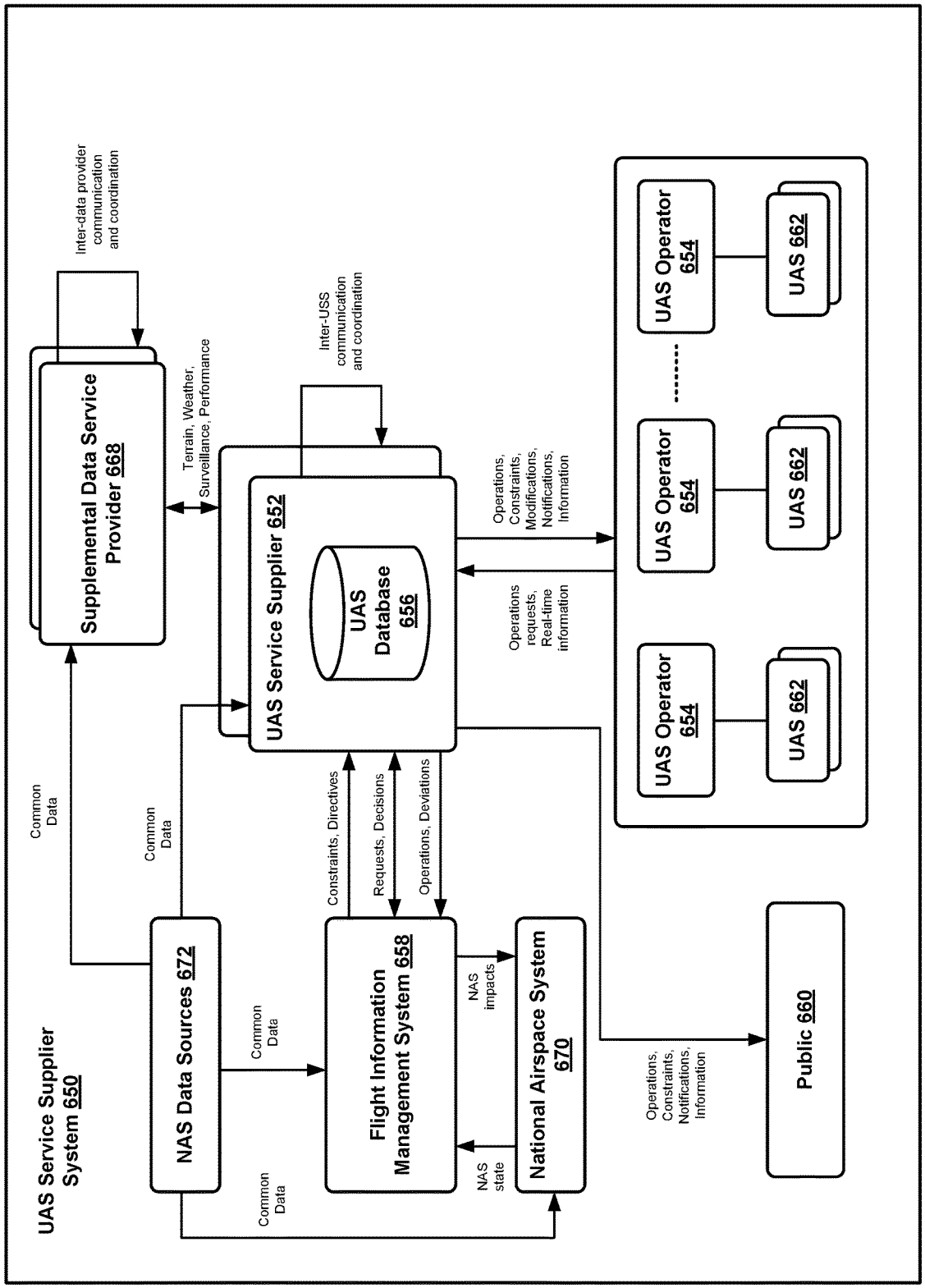
FIG. 6B illustrates an example architecture for a UAS service supplier system, according to an example embodiment.

FIG. 6B illustrates an example architecture for a UAS service supplier (US S) system 650, according to an example embodiment. As shown in FIG. 6B, a plurality of UAS service suppliers (USS) 652 may communicate with multiple entities in the USS system 650, including a plurality of independent UAS operators 654, a UAS database 656, a Flight Information Management System (FIMS) 658, and the general public 660. The USSs 652 may (i) accept operations data from UAS operators 654 using a unique UAS identifier 612, (ii) provide airspace data to other UAS operators 654, and (iii) federate operations across the FIMS 658 to other USSs 652. The USP 652 may also provide route validation for a UAS 662 and interface with manned air traffic control, among other services.

Each USS 652 provides service to one of a plurality of service areas within an airspace. A given USS 652 may accept data input from an operating UAS 662 through communications with the UAS operator 654 (e.g. through a mobile device or other computing device). Such operations data received by the USS 652 identifies data for each UAS 662 with a unique UAS identifier 612 assigned to the UAS 662. The owner information 610 is not received by the USS 652, such that a given UAS 662 is only identifiable by the USS 652 via the unique UAS identifier 612.

The operations data input may be as simple as an 'I am flying in this area' notification from an operator 652 (e.g. using a mobile application). The unique UAS identifier 612 may then appear on a shared public map for the duration of their operations. Optionally, the UAS 662 could provide periodic telemetry updates to the USS 652 via operator-provided connectivity (e.g., using a mobile phone application). In another example, the operations data input may include real time position telemetry, and planned 4-dimensional routes (e.g., xyzt data) submitted for validation against other known routes.

Each USS 652 may also receive, from the other USSs 652 for the airspace, operation data for UASs 662 operating in the other service areas served the other USSs 652. The operation data for the other service areas identifies data for each UAS 662 with a unique UAS identifier 612 assigned to the UAS 662. Each USS 652 may then combine (i) the operation data received from the UAS operators 654 for the corresponding service area, with (ii) the operation data received from the other USSs 652 for the other service areas in the airspace, to maintain an airspace-wide UAS database 656, wherein the UAS database 656 identifies operation data for each UAS 662 comprising the unique UAS identifier 612 assigned to the UAS 662. The UAS database 656 for each USS 652 may or may not be physically co-located (e.g., it is possible the USS 652 could interface with the UAS database 656 via a network). In addition, embodiments where some or all of the USSs 652 access the same UAS database 656, and coordinate to maintain a common database, are also possible.

Another role of the USS 652 may be to provide information about the airspace in which UAS operations are conducted. This information will be presented to the participating UAS operator 654 via the USS 652 throughout the operations of the UAS 662. The information provided may include (i) airspace class, (ii) temporary flight restrictions, (iii) locations of airports, national parks, and other critical infrastructure which may impose flight restrictions, and (iv) data about other operating UASs 662 (e.g., real-time position or operating area). The airspace data may also include real-time weather, terrain obstacle information, and cooperative long-range route validation between participating UAS operators 654.

As shown in FIG. 6B, the USS 652 may provide information to the public 660. Such information provide a publicly accessible application interface for obtaining airspace data based on the UAS database 656. The process of providing airspace data to the public is performed by each USS 652 in the USS system 650, so there are redundant points for public access to UAS information. The structure described above allows for a publicly accessible GUI interface in which a user can (i) spot a UAS 662 flying above their house or other facility, (ii) select a UAS 662 on the GUI, and (iii) receive the public unique UAS identifier 612. Such an arrangement also allows UAS operators 654 to learn of and avoid/plan around other UASs 662 operating nearby. In another case, a homeowner or resident may hear or see a UAS 662 flying above their residence, and wants to know if the UAS 662 is supposed to be there and perhaps who to contact if they have a complaint. In such a case, the USS 652 may provide a flight plan via the GUI to the user, and the user can compare the flight plan to what they are actually observing to see if the UAS 662 is in its expected location. If it is not, the user may contact an appropriate regulatory authority, possibly through the GUI.

The structure described above allows for public visibility of UAS operations (by way of the USS 652 and public interface 660 that only utilize unique UAS identifiers 612, separate from owner information), and facilitates monitoring and enforcement of airspace rules (by way of registry tracing unique UAS identifiers to corresponding owner information), while also protecting owner privacy (through separation of the UAS registry 614 that traces unique UAS identifiers 612 to owner information 610, from the public-facing USS systems 650).

FIG. 6B also illustrates a supplemental data service provider 668 in communication with the USSs 652. The supplemental data service provider 668 may include radar and other info used to track UAss, weather reports, map data, other data used to keep track of the environment and use of the airspace. FIG. 6B also illustrates a national airspace system (NAS) 670 in communication with the FIMS 658 and NAS data sources 672. The NAS data sources 672 provides NAS data to the FIMS 658, the NAS 670, the supplemental data service provider 668, and the USS 652. Such NAS data may be used to adjust flight plans or other operations data.

Figure 6C:
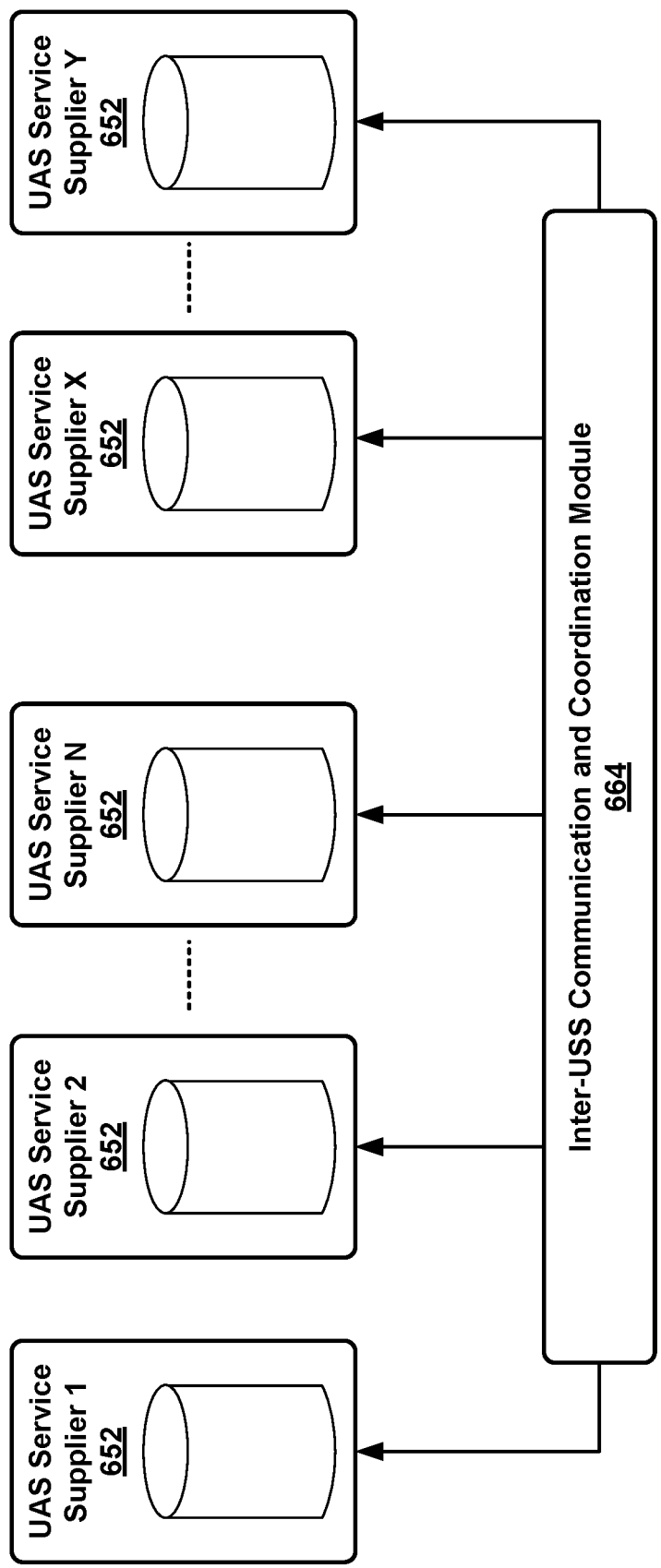
FIG. 6C illustrates a plurality of UAS service suppliers in communication with one another, according to an example embodiment.

FIG. 6C illustrates a plurality of USSs 652 in communication with one another, according to an example embodiment. Data may be shared between the plurality of USSs 652 via an inter-USS communication and coordination module 664. The inter-USS communication and coordination module 664 is configured to aggregate information from all of the USSs 652, and further interface with manned air traffic control.

The inter-USS communication and coordination module 664 is based around an agreed-upon protocol definition, communicated using scalable internet technologies (e.g. Hypertext Transfer Protocol Secure (HTTPS)). Information received by one USS 652 is published via the inter-USS communication and coordination module 664 to all other subscribing USSs 652, such that the state of the airspace is shared across all participants. This helps ensure no single point of failure, as well as enabling independent implementations, with the potential for value-added functionality in the future.

When the operation data is shared between USSs 652, only the unique UAS identifier 612 is shared. As such, no details including operator data, owner data, aircraft type, etc. is shared between USSs 652. Further, the operation data may be deleted after a predetermined period of time (e.g., every one minute, every five minutes, or every ten minutes as non-limiting examples). As such, in one example the operation data may only be stored on the USS 652 for enough time to verify the identity of the UAS 662, and then the operation data may be deleted. In one particular example, each USS 652 corresponds to a particular latitude/longitude grid cell below the airspace. The inter-US S communication and coordination module 664 may supply flight data to each USS 652 via the agreed-upon protocol. In one example, the flight data is supplied by a pull-based replication of the flight data stored in each USS 652. The flight data may be shared via JavaScript Object Notation (JSON) HTTPS, in one particular example.

In one example, each USS 652 comprises or is communicatively coupled to one or more detection systems for obtaining information relating to operation of UASs in its service area. Such detection systems may include radar or some other detecting means that detect the location and altitude of the UAS and transmit the detected location and altitude to the USS 652. In such an example, the USSs 652 may (i) compare the information relating to operation of a given UAS received from the one or more detection systems with the operation data received from the UAS operator for the given UAS, and (ii) based on the comparison, determine whether the given UAS is operating in accordance with one or more airspace parameters. In response to a determination that the given UAS is not operating in accordance with the operation data received from the UAS operator, the USS 652 may transmit an alert to the UAS operator associated with the given UAS. In one example, the one or more airspace parameters comprises a flight plan of the given UAS. The airspace parameters may comprise other operation data as well, such as altitude, air speed, or noise levels as examples.

In another example, the USS 652 is operable to (i) receive an indication of a location and an altitude of a UAS 662 at a time of day, (ii) transmit the location of the UAS 662, the altitude of the UAS 662, and the time of day to the UAS database 656, where the UAS database 656 includes location, altitude, and time of day data for a plurality of authenticated UASs, and (iii) in response to a determination that the UAS 662 is one of the plurality of authenticated UASs, determine whether or not the UAS 662 is authorized to be present at the location. In such an example, determining whether or not the UAS 662 is authorized to be present at the location may comprise comparing the unique UAS identifier 612 of the UAS 662 with a unique UAS identifier whitelist. The unique UAS identifier whitelist comprises a list of one or more unique UAS identifiers associated with one or more UASs that are authorized to operate at the location. If the unique UAS identifier 612 of the UAS 662 is on the whitelist, a determination that the UAS 662 is authorized to be at the location can be made.

VIII. Example Computing Device

Figure 7:
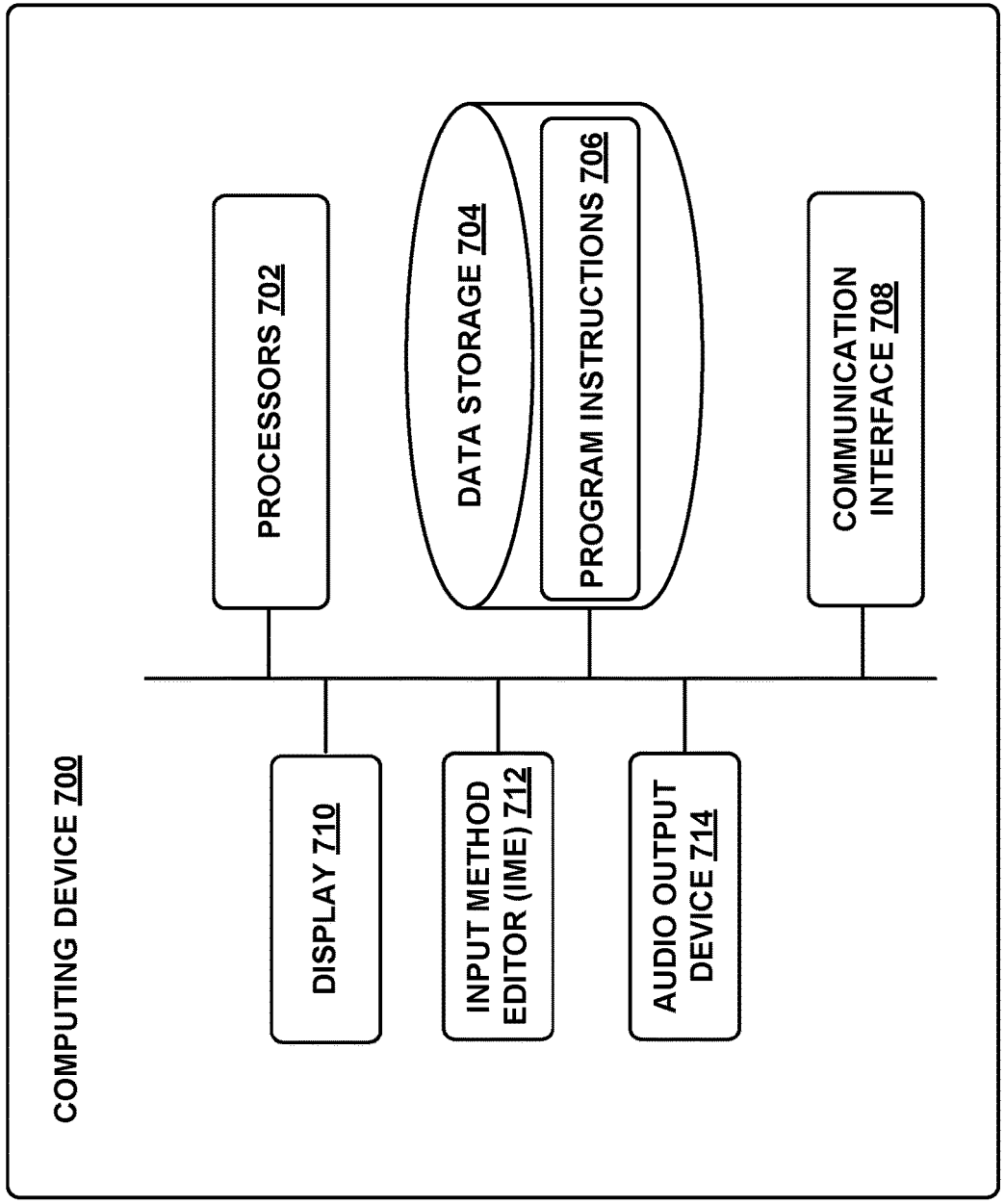
FIG. 7 illustrates a schematic diagram of a computing device, according to an example implementation.

FIG. 7 is a block diagram showing components of an example computing device 700. Generally, the computing device 700 may take the form of a desktop computer, a laptop, a tablet, a wearable computing device, and/or a mobile phone, among other possibilities. Nonetheless, as shown, the computing device 700 may include one or more processors 702, data storage 704, program instructions 706, communication interface 708, display 710, Input Method Editor (IME) 712, and audio output device 714. Note that the computing device 700 is shown for illustration purposes only and computing device 700 may include additional components and/or have one or more components removed without departing from the scope of the disclosure. Further, note that the various components of computing device 700 may be arranged and connected in any manner.

Processor(s) 702 may be a general-purpose processor or a special purpose processor (e.g., digital signal processors, application specific integrated circuits, etc.). The processor(s) 702 can be configured to execute computer-readable program instructions 706 that are stored in the data storage 704 and are executable to carry out various functions described herein, among others The data storage 704 may include or take the form of one or more computer-readable storage media that can be read or accessed by processor(s) 702. The one or more computer-readable storage media can include volatile and/or non-volatile storage components, such as optical, magnetic, organic or other memory or disc storage, which can be integrated in whole or in part with processor(s) 702. In some implementations, the data storage 704 can be implemented using a single physical device (e.g., one optical, magnetic, organic or other memory or disc storage unit), while in other implementations, the data storage 704 can be implemented using two or more physical devices. Further, in addition to the computer-readable program instructions 706, the data storage 704 may include additional data such as diagnostic data, among other possibilities.

The communication interface 708 may allow computing device 700 to communicate, using analog or digital modulation, with other devices, servers, access networks, and/or transport networks. Thus, communication interface 708 may facilitate circuit-switched and/or packet-switched communication, such as plain old telephone service (POTS) communication and/or Internet protocol (IP) or other packetized communication. For instance, communication interface 708 may include a chipset and antenna arranged for wireless communication with a radio access network or an access point. Also, communication interface 708 may take the form of or include a wireline interface, such as an Ethernet, Universal Serial Bus (USB), or High-Definition Multimedia Interface (HDMI) port. Communication interface 708 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 708. Furthermore, communication interface 708 may comprise multiple physical communication interfaces (e.g., a Wifi interface, a BLUETOOTH® interface, and a wide-area wireless interface).

Display 710 may take on any form (e.g., LED, LCD, OLED, etc.). Further, display 710 may be a touchscreen display (e.g., a touchscreen display on a tablet). Display 710 may show a graphical user interface (GUI) that may provide an application through which a user may interact with the systems disclosed herein.

Further, the computing device 700 may receive user input (e.g., from the user of the computing device 700) via IME 712. In particular, the IME 712 may allow for interaction with the GUI such as for scrolling, providing text, and/or selecting various features of the application, among other possible interactions. The IME 712 may take on various forms. In one example, the IME 712 may be a pointing device such as a computing mouse used for control of the GUI. However, if display 710 is a touchscreen display, user touch input can be received (e.g., such as using a finger or a stylus) that allows for control of the GUI. In another example, IME 712 may be a text IME such as a keyboard that provides for selection of numbers, characters and/or symbols to be displayed via the GUI. For instance, in the arrangement where display 710 is a touchscreen display, portions of the display 710 may show the IME 712. Thus, touch-input on the portion of the display 710 including the IME 712 may result in user-input such as selection of specific numbers, characters, and/or symbols to be shown on the GUI via display 710. In yet another example, the IME 712 may be a voice IME that may be used that receives audio input, such as from a user via a microphone (not shown) of the computing device 700, that is then interpretable using one of various speech recognition techniques into one or more characters than may be shown via display 710. Other examples may also be possible.

Yet further, audio output device 714 may include one or more devices configured to convert electrical signals into audible signals (e.g., sound pressure waves). As such, the audio output device 714 may take the form of headphones (e.g., over-the-ear headphones, on-ear headphones, ear buds, wired and wireless headphones, etc.), one or more loudspeakers, or an interface to such an audio output device (e.g., a ¼" or ⅛" tip-ring-sleeve (TRS) port, a USB port, etc.). In some implementations, the audio output device 714 may include an amplifier, a communication interface (e.g., BLUETOOTH interface), and/or a headphone jack or speaker output terminals. Other systems or devices configured to deliver perceivable audio signals to a user are possible.

IX. Example Server

Figure 8:
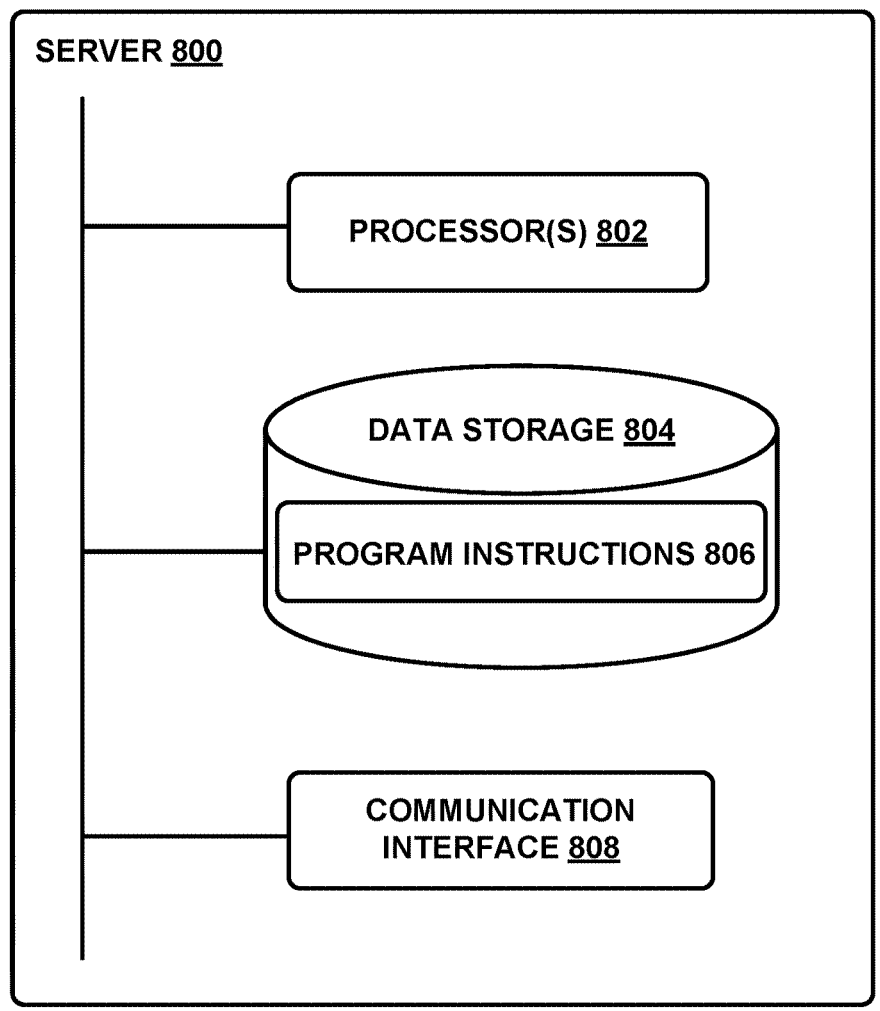
FIG. 8 illustrates a schematic diagram of a server, according to an example implementation.

FIG. 8 illustrates a schematic diagram of a server 800, according to an example implementation. The server 800 includes one or more processor(s) 802 and data storage 804, such as a non-transitory computer readable medium. Additionally, the data storage 804 is shown as storing program instruction 806, which may be executable by the processor(s) 802. Further, the server 800 also includes a communication interface 808. Note that the various components of server 800 may be arranged and connected in any manner.

Moreover, the above description of processor(s) 702, data storage 704, and communication interface 708, may apply to any discussion relating to the respective component being used in another system or arrangements. For instance, as noted, FIG. 8 illustrates processors, data storage, and a communication interface as being incorporated in another arrangement. These components at issue may thus take on the same or similar characteristics (and/or form) as the respective components discussed above in association with FIG. 7. However, the components at issue could also take on other characteristics (and/or form) without departing from the scope of the disclosure.

In practice, a server may be any program and/or device that provides functionality for other programs and/or devices (e.g., any of the above-described devices), which could be referred to as "clients". Generally, this arrangement may be referred to as a client-server model. With this arrangement, a server can provides various services, such as data and/or resource sharing with a client and/or carrying out computations for a client, among others. Moreover, a single server can provide services for one or more clients and a single client can receive services from one or more servers. As such, servers could take various forms (currently known or developed in the future), such as a database server, a file server, a web server, and/or an application server, among other possibilities.

Generally, a client and a server may interact with one another in various ways. In particular, a client may send a request or an instruction or the like to the server. Based on that request or instruction, the server may perform one or more operations and may then respond to the client with a result or with an acknowledgement or the like. In some cases, a server may send a request or an instruction or the like to the client. Based on that request or instruction, the client may perform one or more operations and may then respond to the server with a result or with an acknowledgement or the like. In either case, such communications between a client and a server may occur via a wired connection or via a wireless connection, such as via a network for instance.

X. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product. Such privacy controlled data might include (without limitation) information related to: an individual's identity, and individual's location, an individual's order history, a UAS's identity, a UAS's location, a UAS's flight history, a business's identity, a business's location, and/or a business's order history, among others.'

Accordingly, in situations in which system(s) collect and/or make use of information about entities (e.g., individuals, UASs, and/or businesses), data may be treated in one or more ways before it is stored or used, so that personally identifiable information is removed or otherwise cannot be discovered by an unauthorized entity/system.

In one example, an entity's identity and/or geographic location may be treated so that no personally identifiable information can be determined for the entity. To do so, a system may transmit and/or receive data in the form of anonymized data streams. That is, data representing information related to one or more entities may not provide any information related to respective identities and/or locations of the one or more entities, thereby maintaining privacy.

In another example, when data is set to include information related to an entity's identity and/or location, the data could be arranged so that this information is specified in such a way that only an authorized entity/system could ascertain a particular identify and/or a particular location of an entity. To do so, a system may transmit and/or receive data in the form of coded data streams in which the information takes the form a code interpretable only by an authorized entity/system.

In yet another example, data representing information related to an entity's identity and/or location may be encrypted so that only an authorized entity/system could obtain access to the information. For instance, an authorized entity/system could obtain access to the information only through use of a previously-obtained security key that enables access to the information.

In yet another example, data representing information related to an entity's identity and/or location may only be available temporarily. For instance, a system could be configured to store such data for a certain time period and to then permanently delete the data upon detecting expiration of this time period. Other examples are possible as well.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

We claim:
1. A system comprising:
   a first unmanned aircraft system ("UAS") service supplier computing system, wherein the USS computing system provides service to a first service area within an airspace, wherein the first UAS service supplier ("USS") computing system is operable to:
   (a) receive, from UAS operators, first operation data for a first plurality of UASs operating in the first service area, wherein the received first operation data comprises, for each UAS in the first plurality of UASs: a unique UAS identifier, location data, and time-of-day data corresponding to the location data, respectively;

(b) receive, from a second USS computing system, second operation data for a second plurality of UASs operating in a second service area within the airspace, wherein the received second operation data comprises, for each UAS in the second plurality of UASs: a unique UAS identifier, location data, and time-of-day data corresponding to the location data, respectively;

(c) maintain the first operation and second operation data in a UAS database, wherein the UAS database does not include owner information;

(d) provide a publicly accessible application interface for obtaining at least a portion of the first operation data and second operation data from the UAS database; and (e) provide, to the second USS computing system, the first operation data such that the first and second operation data are redundantly stored in both the first and second USS computing systems.

2. The system of claim 1, further comprising an inter-USS communication and coordination ("CC") module configured to aggregate information from each USS computing system operating within the airspace,
wherein receiving the second operation data comprises receiving the second operation data by way of the inter-USS CC module, and
wherein the inter-US S CC module is operable to:
determine that the first USS computing system is a subscribing USS computing system; and
in response to the determination, provide the second operation data to the first USS computing system.

3. The system of claim 1, wherein the first USS computing system is further operable to receive, from a detection system, third operation data for a third plurality of UASs operating in the first service area, wherein the received third operation data comprises, for each UAS in the third plurality of UASs: location data and time-of-day data corresponding to the location data, respectively, wherein the third plurality of UASs may include some or all the of the first plurality of UASs.

4. The system of claim 3, wherein the location data includes altitude.

5. The system of claim 3, wherein the first USS computing system is further operable to:
for a given UAS in the third plurality of UASs, compare the respective third operation data for the given UAS with the first operation data; and
based on the comparison, determine whether the given UAS is an authenticated UAS, wherein an authenticated UAS is in the first plurality of UASs and has a unique UAS identifier.

6. The system of claim 5, wherein the first USS computing system is further operable to:
if the given UAS is an authenticated UAS, determine whether the given UAS is operating in accordance with the first operation data for the given UAS.

7. The system of claim 6, wherein the first USS computing system is further operable to:
in response to a determination that the given UAS is not operating in accordance with the first operation data, cause an alert to be transmitted to a UAS operator associated with the given UAS.

8. The system of claim 1, wherein the first USS computing system is further operable to:
receive an indication of a location of a given UAS at a time of day;
for the given UAS, compare the received indication of the location of the given UAS at the time of day with the first operation data; and
based on the comparison, determine whether the given UAS is an authenticated UAS, wherein an authenticated UAS is in the first plurality of UASs and has a unique UAS identifier.

9. The system of claim 8, wherein the first USS computing system is further operable to:
in response to a determination that given UAS is an authenticated UASs, determine whether the given UAS is authorized to be present at the location.

10. The system of claim 9, wherein the first USS computing system is further operable to:
in response to a determination that the given UAS is not authorized to be present at the location, cause an alert to be displayed.

11. The system of claim 9, wherein determining whether or not the given UAS is authorized to be present at the location comprises comparing the unique UAS identifier of the UAS with a unique UAS identifier whitelist, wherein the unique UAS identifier whitelist comprises a list of one or more unique UAS identifiers associated with one or more UASs that are authorized to operate at the location.

12. The system of claim 1, wherein the owner information comprises personally identifiable information of owners of each UAS in the first plurality of UASs and each UAS in the second plurality of UASs.

13. The system of claim 1, wherein each unique UAS identifier in the first operation data and the second operation data corresponds to a UAS account maintained in a UAS registry, wherein the UAS registry is separate from the first USS computing system and the second USS computing system.

14. The system of claim 1, wherein the unique UAS identifier comprises a unique human-readable identifier that is traceable through a UAS registry to an owner associated with the unique UAS identifier, wherein the UAS registry is separate from the first USS computing system and the second USS computing system.

15. The system of claim 1, wherein the publicly accessible application interface comprises a map displaying a location of one or more UASs operating in the first service area.

16. The system of claim 15, wherein the publicly accessible application interface is configured to receive a user input selecting a given UAS of the one or more UASs operating in the first service area, and responsively display a unique UAS identifier associated with the given UAS on the publicly accessible application interface.

17. The system of claim 1, wherein the publicly accessible application interface comprises a map displaying a location of one or more UASs operating in the second service area.

18. The system of claim 1, wherein the publicly accessible application interface comprises a map displaying a location of one or more UASs operating in the first service area and the second service area.

19. The system of claim 1, wherein each USS computing system is further operable to:
delete the first operation data and the second operation data after a predetermined period of time.

20. The system of claim 19, wherein the first and second USS computing systems require a threshold amount of time to verify an identity of a given UAS operating in the airspace, and wherein the predetermined period of time is greater than the threshold amount of time.

* * * * *